(12) United States Patent
Yamada et al.

(10) Patent No.: US 7,965,418 B2
(45) Date of Patent: *Jun. 21, 2011

(54) IMAGE PROCESSING APPARATUS AND IMAGE PROCESSING METHOD

(75) Inventors: Akitoshi Yamada, Kanagawa (JP); Hiromitsu Hirabayashi, Kanagawa (JP); Masao Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/952,819

(22) Filed: Nov. 23, 2010

(65) Prior Publication Data

US 2011/0069355 A1 Mar. 24, 2011

Related U.S. Application Data

(60) Continuation of application No. 12/431,624, filed on Apr. 28, 2009, now Pat. No. 7,859,723, which is a continuation of application No. 11/370,982, filed on Mar. 9, 2006, now Pat. No. 7,548,346, which is a division of application No. 09/993,641, filed on Nov. 27, 2001, now Pat. No. 7,099,046.

(30) Foreign Application Priority Data

Nov. 30, 2000 (JP) ................................. 2000-364629
Nov. 30, 2000 (JP) ................................. 2000-365339
Nov. 30, 2000 (JP) ................................. 2000-365340

(51) Int. Cl.
*H04N 1/405* (2006.01)
*H04N 1/52* (2006.01)

(52) U.S. Cl. ...................... 358/3.05; 358/534

(58) Field of Classification Search ........ 358/3.03–3.06, 358/3.21, 1.9, 534–536; 382/162, 251, 252
See application file for complete search history.

(56) References Cited

U.S. PATENT DOCUMENTS 4,313,124 A 1/1982 Hara
(Continued)

FOREIGN PATENT DOCUMENTS

EP 0 654 940 5/1995
(Continued)

OTHER PUBLICATIONS

R.W. Floyd, et al., "An Adaptive Algorithm for Spatial Greyscale", Proceedings of the Society for Information Display, vol. 17, No. 2, Second Quarter 1976, pp. 75-77.

*Primary Examiner* — Scott A Rogers
(74) *Attorney, Agent, or Firm* — Fitzpatrick, Cella, Harper & Scinto

(57) ABSTRACT

Image processing apparatus and image processing method for formation of high quality image by high-speed error diffusion processing by execution of more complicated threshold condition processing in a simple manner. When error diffusion processing is performed on multivalued image data having plural density components and the result of processing is outputted, upon execution of error diffusion processing on a first density component among the plural density components, a threshold value used in the error diffusion processing is determined based on a density value of a second density component, then the error diffusion processing is performed on the first density component based on the determined threshold value, and the result of execution of the error diffusion processing is outputted. Further, upon execution of the error diffusion processing on the second density component among the plural density components, a threshold value used in the error diffusion processing is determined based on a density value of the first density component, then the error diffusion processing is performed on the second density component based on the determined threshold value, and the result of the error diffusion processing is outputted.

9 Claims, 26 Drawing Sheets

U.S. PATENT DOCUMENTS

| | | | |
|---|---|---|---|
| 4,345,262 A | 8/1982 | Shirato | |
| 4,459,600 A | 7/1984 | Sato | |
| 4,463,359 A | 7/1984 | Ayata | |
| 4,558,333 A | 12/1985 | Sugitami | |
| 4,723,129 A | 2/1988 | Endo et al. | |
| 4,740,796 A | 4/1988 | Endo | |
| 5,289,293 A | 2/1994 | Kato | |
| 5,351,137 A | 9/1994 | Kato | |
| 5,565,994 A | 10/1996 | Eschbach | |
| 5,739,917 A | 4/1998 | Shu | |
| 5,838,885 A | 11/1998 | Hudson | |
| 5,949,965 A | 9/1999 | Gondek | |
| 5,973,803 A | 10/1999 | Cheung | |
| 6,057,933 A | 5/2000 | Hudson | |
| 6,870,644 B2 | 3/2005 | Schramm | |
| 7,167,278 B2 * | 1/2007 | Yamada et al. | 358/3.05 |
| 7,245,397 B2 * | 7/2007 | Yoshida | 358/1.9 |
| 7,295,347 B2 | 11/2007 | Mantell | |
| 7,315,398 B2 | 1/2008 | Mantell | |
| 7,342,684 B2 * | 3/2008 | Imafuku et al. | 358/1.9 |
| 2003/0174352 A1 | 9/2003 | Yamada | |
| 2003/0214676 A1 | 11/2003 | Yamada | |
| 2004/0051905 A1 | 3/2004 | Yamada | |
| 2004/0196478 A1 | 10/2004 | Imafuku | |
| 2010/0265548 A1 * | 10/2010 | Yamaguchi et al. | 358/3.05 |

FOREIGN PATENT DOCUMENTS

| | | |
|---|---|---|
| EP | 0 820 187 | 1/1998 |
| EP | 0 833 499 | 4/1998 |
| EP | 0 889 640 | 1/1999 |
| JP | 54-56847 | 5/1979 |
| JP | 59-123670 | 7/1984 |
| JP | 59-138461 | 8/1984 |
| JP | 60-71260 | 4/1985 |
| JP | 8-279920 | 10/1996 |
| JP | 9-139841 | 5/1997 |
| JP | 11-10918 | 1/1999 |
| JP | 2000-184215 | 4/2009 |

* cited by examiner

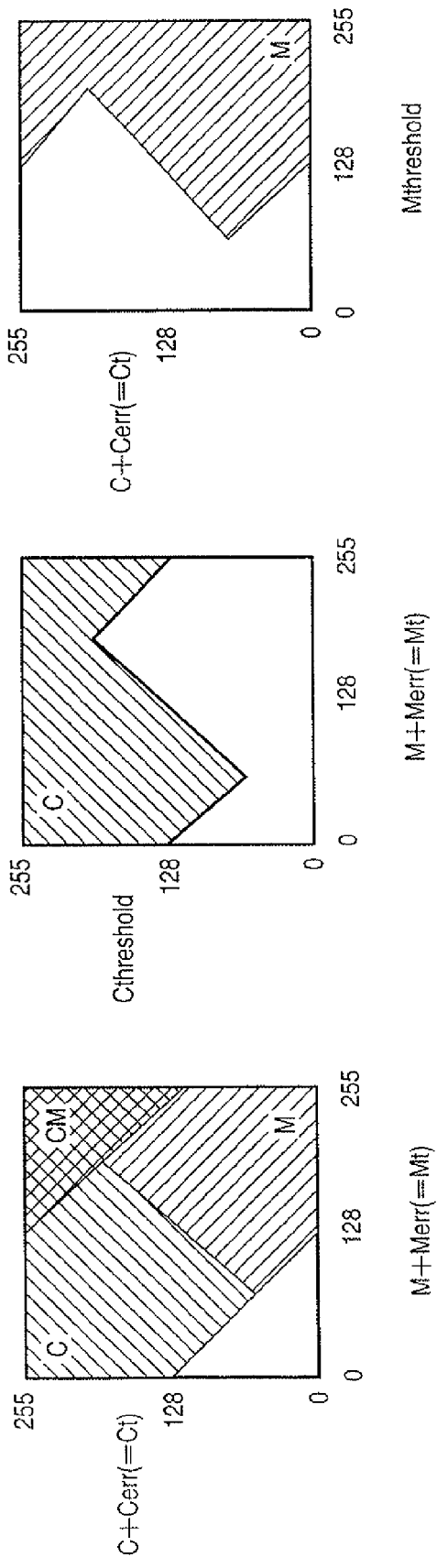

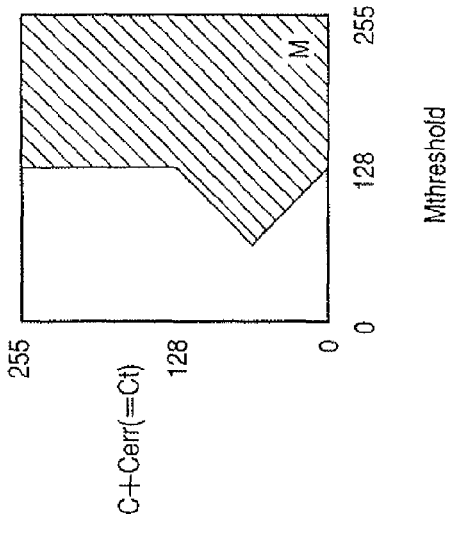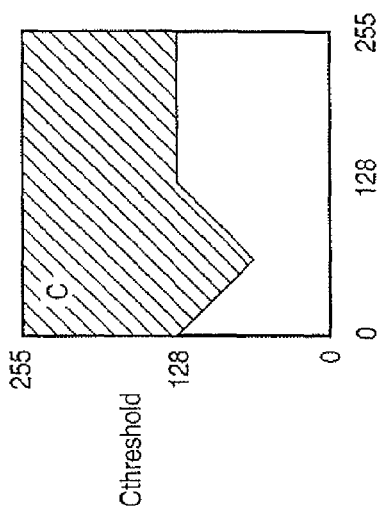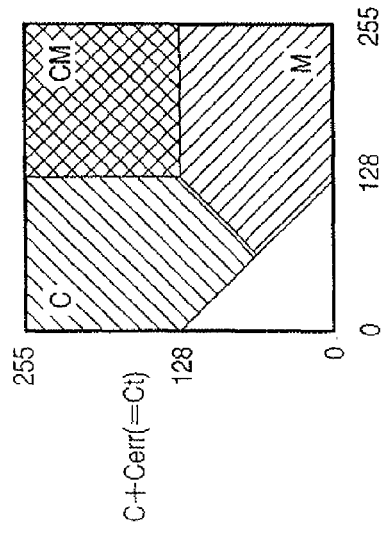

FIG. 18

| Y_index | | | | |
|---|---|---|---|---|
| 4 | CM | CM | CM | CM |
| 3 | Cm | Cm | cM | cM |
| 2 | C | cm | cm | M |
| 1 | c | c | m | m |
| 0 | — | — | — | — |
| | 0 | 1 | 2 | 3 | X_index

FIG. 19A

Y_index

| | 0 | 1 | 2 | 3 |
|---|---|---|---|---|
| 4 | C | C | C | C |
| 3 | C | C | c | c |
| 2 | C | c | — | — |
| 1 | c | c | — | — |
| 0 | — | — | — | — |

X_index

FIG. 19B

Y_index

| | 0 | 1 | 2 | 3 |
|---|---|---|---|---|
| 4 | M | M | M | M |
| 3 | m | m | M | M |
| 2 | — | m | m | M |
| 1 | — | — | m | m |
| 0 | — | — | — | — |

X_index

F I G. 26A 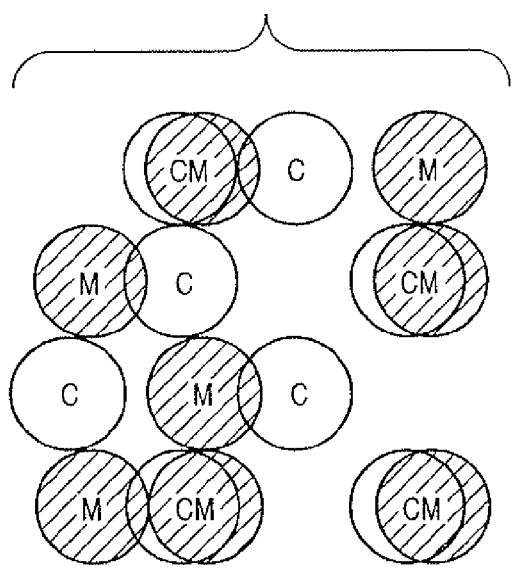
F I G. 26B 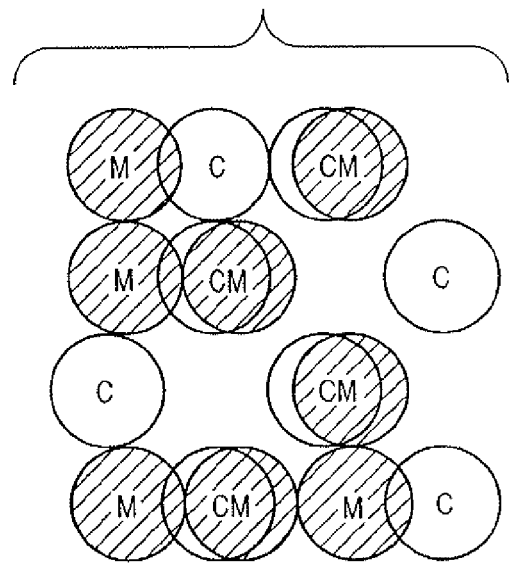

IMAGE PROCESSING APPARATUS AND IMAGE PROCESSING METHOD

This application is a continuation of application Ser. No. 12/431,624, filed on Apr. 28, 2009 (pending), which is a continuation of application Ser. No. 11/370,982, filed on Mar. 9, 2006, now U.S. Pat. No. 7,548,346, issued on Jun. 16, 2009, which is a division of application Ser. No. 09/993,641, filed on Nov. 27, 2001, now U.S. Pat. No. 7,099,046, issued on Aug. 29, 2006.

FIELD OF THE INVENTION

The present invention relates to an image processing apparatus and an image processing method, and more particularly, to an image processing apparatus and an image processing method for pseudo-halftoning by performing error diffusion processing on multivalued image density data.

BACKGROUND OF THE INVENTION

Conventionally, the error diffusion method is known as pseudo-halftoning to represent a multivalued image in binary representation (See "An Adaptive Algorithm for Spatial Gray Scale" in Society for Information Display 1975 Symposium Digest of Technical Papers, 1975, pp. 36). According to this method, assuming that a pixel of interest is P and its density is v, densities of adjacent pixels P0 to P3 of the pixel of interest P, v0 to v3, and a threshold value for binarization is T, a binarization error E in the pixel of interest P is distributed by empirically obtained weighting coefficients W0 to W3 into the adjacent pixels P0 to P3 so that a mean density is macroscopically equal to an original image density.

For example, when the value of output binary data is "o",

If $v \geq T$ holds, $o=1$, $E=v-V\text{max}$;   (1)

If $v<T$ holds, $o=0$, $E=v-V\text{min}$;

(Vmax: maximum density, Vmin: minimum density)

$v0=v0+E \times W0$;   (2)

$v1=v1+E \times W1$;   (3)

$v2=v2+E \times W2$;   (4)

$v3=v3+E \times W3$;   (5)

(Example of weighting coefficients: W0=7/16, W1=1/16, W2=5/16, W3=3/16)

Conventionally, when a multivalued image is outputted by a color ink-jet printer or the like using 4 color inks of cyan (C), magenta (M), yellow (Y) and black (K), the pseudo-halftoning is performed by using the error diffusion method or the like for each color. Regarding each color, the processing provides an excellent visual characteristic, however, regarding overlapped two or more colors, does not always provide such a excellent visual characteristic.

To solve this problem, Japanese Published Unexamined Patent Application Nos. Hei 8-279920 and Hei 11-10918 disclose halftoning to obtain an excellent visual characteristic even in overlapped two or more colors by using the error diffusion method for combination of two or more colors.

Further, Japanese Published Unexamined Patent Application No. Hei 9-139841 discloses similar improvement by performing pseudo-halftoning independently on two or more colors and then correcting output values by the sum of input values.

Especially, to reduce graininess of intermediate density area of color image, it is effective to perform image formation avoiding overlap between cyan (C) component and magenta (M) component, and for this purpose, the following method is employed.

FIG. 24 shows image formation control according to a conventional ink-jet method.

In this figure, image data is multivalue data where each density component (YMCK) of each pixel is represented as 8-bit data (0-255 gray-scale value). Assuming that densities of C and M components of original image are C and M, densities Ct and Mt of the C and M components of pixel of interest in the multivalue color image are represented as follows.

$Ct=C+Cerr$ $Mt=M+Merr$

Cerr and Merr are error-diffused values of the C and M components with respect to the pixel of interest.

As shown in FIG. 24, regarding C and M image formation, 4 types of image formation controls are performed in accordance with the densities of the C and M components of the pixel of interest.

1. If the sum of (Ct+Mt) is equal to or less than a threshold value (Threshold1), i.e., the value belongs to an area (1) in FIG. 24, dot printing is not performed using C or M inks.
2. If the sum of (Ct+Mt) is greater than the threshold value (Threshold1) and the sum of (Ct+Mt) is less than another threshold value (Threshold2), and Ct>Mt holds, i.e., the value belongs to an area (2) in FIG. 24, dot printing using only the C ink is performed.
3. If the sum of (Ct+Mt) is greater than the threshold value (Threshold1) and the sum of (Ct+Mt) is less than the other threshold value (Threshold2), and $Ct \leq Mt$ holds, i.e., the value belongs to an area (3) in FIG. 24, dot printing is performed using only the M ink.
4. If the sum of (Ct+Mt) is equal to or greater than the other threshold value (Threshold2), i.e., the value belongs to an area (4) in FIG. 24, dot printing is performed using the C and M inks.

Note that Threshold1<Threshold2 holds.

However, in the above conventional art, as the image formation for the C and M components differs in accordance with the sum of the density values of the C and M components, the image formation control must be simple. If pixels where image data to be processed changes prior near a threshold value are adjacent to each other, a pixel where the C ink and the M ink overlap with each other and a pixel where these inks do not overlap with each other mixedly appear in the narrow area, and as a result, the quality of image formation is degraded.

To prevent the degradation of image quality, more complicated thresholds may be employed. However, the threshold condition processing must be more complicated, and processing time is prolonged.

Further, since the conventional threshold processing must be inevitably simple in the processing based on the sum of the density values of the C and M components, flexible processing cannot be performed without difficulty.

Further, if exclusive error diffusion is to be performed by using the sum of three components including the black (K) component, the processing becomes very complicated as represented in the following code.

```
Ct=C+Cerr
Mt=M+Merr
Kt=K+Kerr
If(Ct+Mt+Kt>Threshold1)
If(Ct+Mt+Kt<Threshold2)
    If(Ct>Mt&&Ct>Kt)
      Print C
    Else
    If(Mt>Ct&&Mt>Kt)
      Print M
    Else
      Print K
    Else
        If(Ct+Mt+Kt<Threshold 3)
    If(Ct<Mt&&Ct>Kt)
      Print M
      Print K
    Else
    If(Mt<Ct&&Mt<Kt)
      Print C
      Print K
    Else
      Print C
      Print M
    Else
      Print C
      Print M
      Print K
```

Further, in the above conventional art, the input multivalued image data is merely binarized by each color component and subjected to the error diffusion processing as the pseudo-halftoning. On the other hand, in accordance with the progress of color image printing technology by the ink-jet method, some ink-jet printers can handle multivalued image data for color image printing by drop modulation or use of same-color thick and thin inks.

Accordingly, it is desirable to apply multivalue error diffusion processing to the above ink-jet printer. However, in the multivalue error diffusion processing, as the threshold condition processing is so complicated, if the processing is applied to an actual printer, the reduction of printing speed is conceivable. For this reason, upon application of the multivalue error diffusion processing to an ink-jet printer to handle multivalued image data, a processing method capable of maintaining a high processing speed is desirable.

Further, as in the case of the above conventional art, in image formation by completely and exclusively arranging C component and M component dots, in an original image having respectively 50% C and M component, all the pixels are filled with C ink dots or M ink dots, ideally, as shown in FIG. 25A. In this state, if C-ink dot positions and M-ink dot positions are relatively shifted from each other for some reason as shown in FIG. 25B, the image has pixels where C-ink dot and M-ink dot overlap with each other (bluish pixels) and blank pixels without dot throughout most of the image.

Accordingly, in printing by an ink-jet printer using a printhead where C-ink nozzles and M-ink nozzles are arrayed in a scan direction of a carriage of the printer, a formed image periodically changes in accordance with the position of the carriage in the scan direction by variation in carriage scan speed or the like, as shown in FIGS. 25A and 25B, and it looks to a human eye that the density of corresponding area periodically changes due to the variation in probability of occurrence of blank pixels. In other words, to a human eye, the printed result appears as a low-quality image.

On the other hand, if C-ink dots and M-ink dots are independently arranged in an image formation, in an original image having respectively 50% C and M components as in the above case, blank pixels, pixels printed only with the C ink, pixels printed only with the M ink, and pixels printed with both the C and M inks are formed respectively at 25% occurrence uniformly in the formed image, ideally, as shown in FIG. 26A.

In the independent arrangement of C-ink dots and M-ink dots, a pixel to be printed only with the C ink may overlap with an adjacent pixel to be printed with the M ink, as shown in FIG. 26B, on the other hand, there is a probability that a pixel to be printed with both the C and M inks is printed with only the C ink or the M ink. Thus, the overall density change is small in comparison with the exclusive arrangement of C-ink and M-ink dots.

Accordingly, it is understood that the exclusive arrangement of C-ink and M-ink dots has a problem that the uniformity of image is degraded from intermediate to high density areas in view of a trade-off between the effect of reduction of graininess in a highlight portion and image formation accuracy. If only the highlight portion is taken into consideration, as respective dots are initially arranged sufficiently away from each other, the degradation of image quality due to shift of dot positions is very little and the advantage of the exclusive arrangement is rather greater.

SUMMARY OF THE INVENTION

Accordingly, it is an object of the present invention to provide an image processing apparatus and an image processing method capable of (1) forming a high quality image by performing high-speed error diffusion processing by performing more complicated threshold condition processing in a simple manner; (2) forming a high quality image at a high speed while using multivalue error diffusion processing; and (3) forming a high quality image by performing optimum pixel arrangement in accordance with image density.

According to one aspect of the present invention, the foregoing object is attained by providing an image processing apparatus for performing error diffusion processing on multivalued image data having plural density components and outputting the result of the error diffusion processing, comprising: first determination means for, upon execution of the error diffusion processing on a first density component among the plural density components, determining a threshold value used in the error diffusion processing based on a density value of a second density component; first error diffusion execution means for executing the error diffusion processing on the first density component based on the threshold value determined by the first determination means; first output means for outputting the result of execution of the error diffusion processing by the first error diffusion execution means; second determination means for, upon execution of the error diffusion processing on the second density component among the plural density components, determining a threshold value used in the error diffusion processing based on a density value of the first density component; second error diffusion execution means for performing the error diffusion processing on the second density component based on the threshold value determined by the second determination means; and second output means for outputting the result of execution of the error diffusion processing by the second error diffusion execution means.

It is preferable that the first and second determination means use a table showing a relation between density and threshold values, for determining the threshold values.

It may be arranged such that the first and second determination means respectively determine plural threshold values for N-ary conversion as well as binarization. In this case, it is preferable that the first and second determination means respectively use plural tables for determining the plural threshold values.

Further, it may be arranged such that the apparatus further comprises: third determination means for, upon execution of the error diffusion processing on a third density component among the plural density components, determining a threshold value used in the error diffusion processing based on the sum of the density values of the first and second density components; third error diffusion execution means for executing the error diffusion processing on the third density component based on the threshold value determined by the third determination means; and third output means for outputting the result of execution of the error diffusion processing by the third error diffusion execution means.

In this manner, it is preferable that in a case where the error diffusion processing is performed on the first to third density components, the first determination means determines the threshold value used in the error diffusion processing on the first density component, based on the sum of the density value of the second density component and a density value of the third density component, and the second determination means determines the threshold value used in the error diffusion processing on the second density component, based on the sum of the density value of the first density component and the density value of the third density component.

Note that the plural density components are a yellow component, a magenta component, a cyan component and a black component, and the first density component is the cyan component, the second density component is the magenta component, and the third density component is the black component.

Further, it is preferable that the apparatus further comprises image formation means such as an ink-jet printer for inputting the error diffusion processing results outputted from the first, second and third output means and performing image formation.

It is preferable that the ink-jet printer has an ink-jet printhead that discharges ink by utilizing thermal energy, and the ink-jet printhead has electrothermal transducers for generating the thermal energy to be supplied to the ink.

According to another aspect of the present invention, the foregoing object is attained by providing an image processing method for performing error diffusion processing on multivalued image data having plural density components and outputting the result of the error diffusion processing, comprising: a first determination step of, upon execution of the error diffusion processing on a first density component among the plural density components, determining a threshold value used in the error diffusion processing based on a density value of a second density component; a first error diffusion execution step of executing the error diffusion processing on the first density component based on the threshold value determined at the first determination step; a first output step of outputting the result of execution of the error diffusion processing at the first error diffusion execution step; a second determination step of, upon execution of the error diffusion processing on the second density component among the plural density components, determining a threshold value used in the error diffusion processing based on a density value of the first density component; a second error diffusion execution step of performing the error diffusion processing on the second density component based on the threshold value determined at the second determination step; and a second output step of outputting the result of execution of the error diffusion processing at the second error diffusion execution step.

According to still another aspect of the present invention, the foregoing object is attained by providing a computer readable storage medium for storing a program for executing the above image processing method.

In accordance with the present invention as described above, when error diffusion processing is performed on multivalued image data having plural density components and the result of processing is outputted, upon execution of the error diffusion processing on the first density component among the plural density components, a threshold value to be used in the error diffusion processing is determined based on the density value of the second density component, then the error diffusion processing is executed on the first density component based on the determined threshold value, and the result of execution of the processing is outputted. Further, upon execution of the error diffusion processing on the second density component among the plural density components, a threshold value to be used in the error diffusion processing is determined based on the density value of the first density component, then the error diffusion processing is executed on the second density component based on the determined threshold value, and the result of execution of the processing is outputted.

According to still another aspect of the present invention, the foregoing object is attained by providing an image processing apparatus for performing error diffusion processing on multivalued image data having plural density components and outputting the result of the error diffusion processing, comprising: calculation means for calculating the sum and difference between density values of the first density component and second density component among the plural density components; M-ary conversion means for converting the sum value into M-ary code by using a first function based on the sum; N-value conversion means for converting the difference value into N-ary code by using a second function based on the difference; and execution means for executing multivalue error diffusion processing respectively on the first and second density components, based on the result of conversion by the M-ary conversion means and the result of conversion by the N-ary conversion means.

Note that M and N are respectively a positive integer equal to or greater than 3.

Further, it is preferable that the first function used in the M-ary conversion means is represented in a first table showing a relation between the sum value and an M-ary code, and the second function used in the N-ary conversion means is represented in a second table showing a relation between the difference value and an N-ary code.

Further, it is preferable that the multivalue error diffusion processing is executed by the execution means by using a two-dimensional table with the result of the conversion by the M-ary conversion means and the result of the conversion by the N-ary conversion means as functions. It may be arranged such that the two-dimensional table is a common table for the first and second density components, otherwise, the two-dimensional table is prepared respectively for the first and second density components.

In the above case, the plural density components are a yellow component, a magenta component, a cyan component and a black component, and the first density component is the cyan component, and the second density component is the magenta component.

Further, it is preferable that the apparatus further comprises image formation means such as an ink-jet printer for inputting the error diffusion processing results and performing image formation.

It is preferable that the ink-jet printer has an ink-jet printhead that discharges ink by utilizing thermal energy, and the ink-jet printhead has electrothermal transducers for generating the thermal energy to be supplied to the ink.

According to still another aspect of the present invention, the foregoing object is attained by providing an image processing method for performing error diffusion processing on multivalued image data having plural density components and outputting the result of the error diffusion processing, comprising: a calculation step of calculating the sum and difference between density values of first density component and second density component among the plural density components; an M-ary conversion step of converting the sum value into M-ary code by using a first function based on the sum; an N-ary conversion step of converting the difference value into N-ary code by using a second function based on the difference; and an execution step of executing multivalue error diffusion processing respectively on the first and second density components, based on the result of conversion at the M-ary conversion step and the result of conversion at the N-ary conversion step.

According to still another aspect of the present invention, the foregoing object is attained by providing a computer readable storage medium for storing a program for executing the above image processing method.

In accordance with the present invention as described above, when error diffusion processing is performed on multivalued image data having plural density components and the result of the error diffusion processing is outputted, the sum and the difference between the density value of the first density component and that of the second density component among the plural density components are calculated, the sum value is converted into M-ary code by using the first function based on the sum, while the difference value is converted into N-ary code by using the second function based on the difference. Then multivalue error diffusion processing is performed on the first density component and the second density component based on the results of the M-ary conversion and the N-ary conversion.

According to still another aspect of the present invention, the foregoing object is attained by providing an image processing apparatus for performing error diffusion processing on multivalued image data having plural density components and outputting the result of the error diffusion processing, comprising: analysis means for examining density values of a first density component and a second density component among the plural density components; and control means for exclusively or independently outputting the result of the error diffusion processing on the first density component and that of the error diffusion processing on the second density component, in accordance with the result of analysis by the analysis means, wherein if at least one of the first and second density components has an intermediate density value, the control means independently outputs the results of the error diffusion processing, while if the first and second density components do not have an intermediate density value, exclusively outputs the results of the error diffusion processing.

It may be arranged such that the analysis means includes: first comparison means for comparing the sum of the density values of the first and second density components among the plural density components with a predetermined threshold value; and second comparison means for comparing the density value of the first density component and the density value of the second density component with each other, and that the control means performs printing by the error diffusion processing based on the first density component or the second density component, based on the results of comparison by the first and second comparison means.

Further, it is preferable that the apparatus further comprises third comparison means for comparing the density value of the first density component with the predetermined threshold value, and the control means further determines whether or not printing by the error diffusion processing is to be performed not only based on the first density component, but also based on the result of comparison by the third comparison means.

Otherwise, it is preferable that the apparatus further comprises fourth comparison means for comparing the density value of the second density component with the predetermined threshold value, and the control means further determines whether or not printing by the error diffusion processing is to be performed not only based on the second density component, but also based on the result of comparison by the fourth comparison means.

In the above case, the plural density components are a yellow component, a magenta component, a cyan component and a black component, and the first density component is the cyan component, and the second density component is the magenta component.

It may be arranged such that the plural density components of the multivalued image data are respectively binarized by the error diffusion processing, otherwise, the plural density components of the multivalued image data are respectively converted into N-ary code ($N \geq 3$ positive integer) by the error diffusion processing. Further, it may be arranged such that the apparatus further comprises a table showing relation between a density value and an N-ary code output value, for the N-ary conversion. It may be arranged such that the table is a common table for the first and second density components, otherwise, the table is prepared respectively for the first and second density components.

Further, it is preferable that the apparatus further comprises image formation means such as an ink-jet printer for inputting the result of execution of the error diffusion processing and performing image formation.

It is preferable that the ink-jet printer has an ink-jet printhead that discharges ink by utilizing thermal energy, and the ink-jet printhead has electrothermal transducers for generating the thermal energy to be supplied to the ink.

Note that the intermediate density is higher than an approximately half level of a maximum density level.

According to still another aspect of the present invention, the foregoing object is attained by providing an image processing method for performing error diffusion processing on multivalued image data having plural density components and outputting the result of the error diffusion processing, comprising: an analysis step of examining density values of a first density component and a second density component among the plural density components; and a control step of exclusively or independently outputting the result of the error diffusion processing on the first density component and that of the error diffusion processing on the second density component, in accordance with the result of analysis at the analysis step, wherein at the control step, if at least one of the first and second density components has an intermediate density value, the results of the error diffusion processing are independently outputted, while if the first and second density components do not have an intermediate density value, the results of the error diffusion processing are exclusively outputted.

According to still another aspect of the present invention, the foregoing object is attained by providing a computer-readable storage medium holding a program for execution of the above-described image processing method.

In accordance with the present invention as described above, when error diffusion processing is performed on multivalued image data having plural density components and the result of processing is outputted, the density value of the first density component and that of the second density component among the plural density components are examined, and in accordance with the result of analysis, the results of error diffusion processing on the first and second density components are exclusively outputted unless the density components of the first and second density component have intermediate densities, otherwise, independently outputted if at least one of the first and second density components has an intermediate density.

The invention is particularly advantageous since the error diffusion processing is performed in consideration of the value of another density component, image formation in consideration of overlap with another component is possible, and a high quality image can be formed.

Further, as the threshold used in the error diffusion processing is determined by using a table, the error diffusion processing can be performed at a high speed by performing more complicated threshold condition processing in a simple manner.

Further, when error diffusion processing is performed on multivalued image data having plural density components and the result of processing is outputted, the sum and difference between the density value of the first density component and that of the second density component among the plural density components are calculated, and the sum value is converted into M-ary code by using the first function based on the sum, while the difference value is converted into N-ary code by using the second function based on the difference. Then based on the results of M-ary and N-ary conversion, the multivalue error diffusion processing is performed on the first and second density components. Accordingly, complicated threshold condition processing accompanying the multivalue error diffusion processing becomes unnecessary due to representing the first and second functions in the form of table, introducing the tables into the multivalue error diffusion processing, and performing the error diffusion processing by referring to these tables. Thus the multivalue error diffusion processing can be performed at a high speed.

Further, when error diffusion processing is performed on multivalued image data having plural density components and the result of processing is outputted, the density value of the first density component and that of the second density component among the plural density components are examined, and in accordance with the result of analysis, the results of error diffusion processing on the first and second density components are exclusively outputted unless the density components of the first or second density component have intermediate densities, otherwise, independently outputted if at least one of the first and second density components has an intermediate density. Accordingly, the graininess from highlight to intermediate density areas in the image can be reduced, and the uniformity of the image can be maintained from the intermediate to high density areas, thus a high quality image can be formed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A to 7C are diagrams showing threshold conditions used in the first embodiment;

FIGS. 8A to 8C are diagrams showing other threshold conditions used in the first embodiment;

FIG. 18 is a diagram showing a two-dimensional common table for C and M components used in the fifth embodiment;

FIGS. 19A to 19B are diagrams showing two-dimensional tables specialized for the C and M components;

FIGS. 26A to 26B are diagrams showing image formation by independently arranging the C and M components.

DETAILED DESCRIPTION OF THE PREFERRED EMBODIMENTS

Preferred embodiments of the present invention will now be described in detail in accordance with the accompanying drawings.

Common Embodiment

First, the outline of a common information processing system used in the following embodiments, the outline of hardware construction, the outline of software construction and the outline of image processing will be described.

Figure 1:
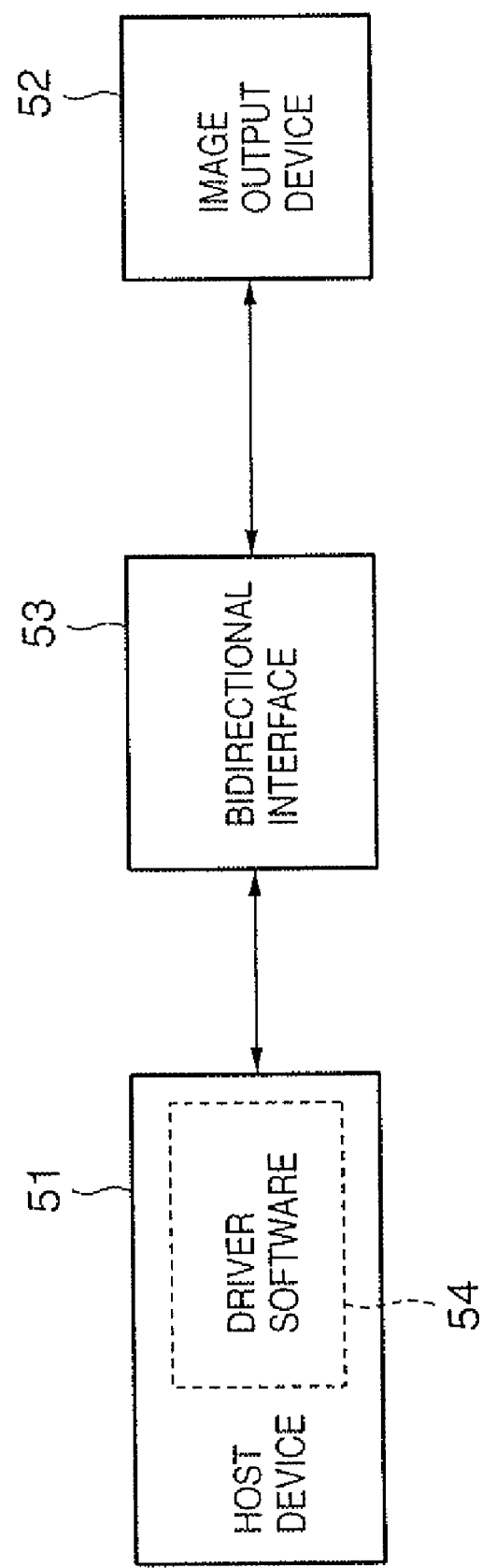
FIG. 1 is a block diagram showing a schematic configuration of an information processing system according to a common embodiment of the present invention.

FIG. 1 is a block diagram showing a schematic configuration of the information processing system according to a common embodiment of the present invention.

As shown in FIG. 1, the information processing system has a host device 51 comprising a personal computer or the like, and an image output device 52 comprising a printer or the like, interconnected via a bidirectional interface 53. Driver software 54, to which the present invention is applied, is loaded into a memory of the host device 51.

1. Hardware Construction of Host Device 51 and Image Output Device 52

Next, the hardware construction of the host device 51 and that of the image output device 52 will be described.

Figure 2:
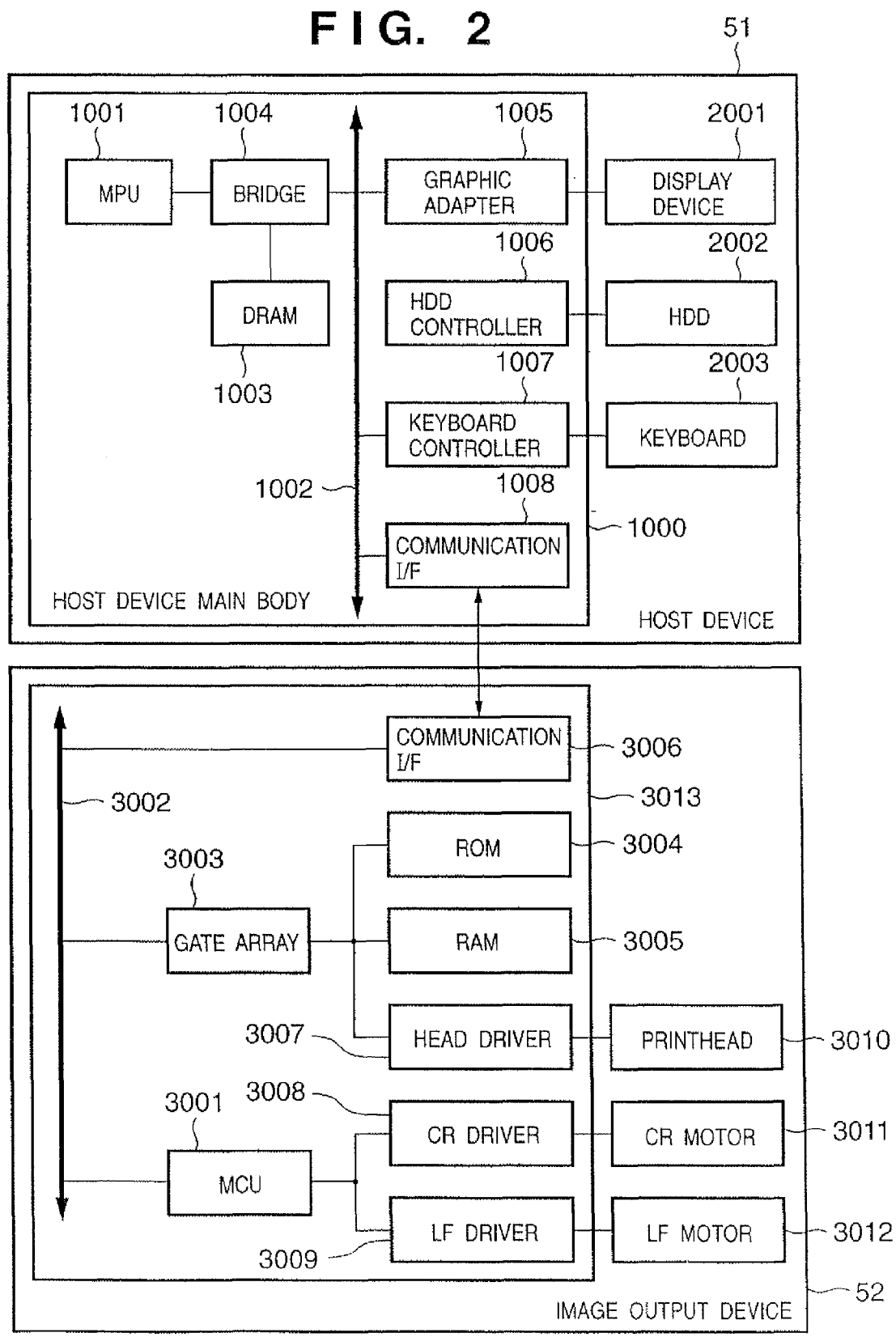
FIG. 2 is a block diagram showing a hardware construction of host device 51 and that of image output device 52 constructing the information processing system.

FIG. 2 is a block diagram showing the hardware construction of the host device 51 and that of the image output device 52 constructing the information processing system.

As shown in FIG. 2, the host device 51, having a processor 1000 and its peripheral devices, serves as a host device. Further, the image output device 52 has a driving portion including a printhead 3010, a carrier (CR) motor 3011 to drive a carrier to move the printhead 3010, a linefeed motor 3012 to feed paper and the like, and a control circuit 3013.

The processor 1000 of the host device 51 includes an MPU 1001 which controls the overall operation of the host device in accordance with a control program, a bus 1002 which interconnects system constituent elements, a DRAM 1003 for temporarily storing programs executed by the MPU 1001 and data, a bridge 1004 which connects the system bus, the memory bus and the MPU 1001, and a graphic adapter 1005 having a control function to display graphic information on a display device 2001 such as a CRT.

Further, the processor 1000 has an HDD controller 1006 which serves as an interface between the processor and an HDD device 2002, a keyboard controller 1007 which serves as an interface between the processor and a keyboard 2003, and a communication I/F 1008 as a parallel interface for communication between the processor and the image output device 52 according to the IEEE 1284 standards.

Further, the processor 1000 is connected, via the graphic adapter 1005, to the display device 2001 (CRT in this embodiment) which displays graphic information and the like for an operator. Further, the processor 1000 is connected, via respective controllers, to the hard disk drive (HDD) device 2002 as a large capacity storage device holding programs and data and the keyboard 2003.

On the other hand, the control circuit 3013 of the image output device 52 has an MCU 3001, having a control program execution function and a peripheral device control function, which controls the overall operation of the image output device main body 52, a system bus 3002 which interconnects the respective constituent elements of the control circuit, and a gate array (G.A.) 3003 including mechanisms to supply print data to the printhead 3010, to perform memory address decoding, and to generate a control pulse to the carrier motor and the like, as a control circuit.

Further, the control circuit 3013 has a ROM 3004 for storing the control programs executed by the MCU 3001, host print information and the like, a DRAM 3005 for storing various data (image print information, print data to be supplied to the printhead and the like), a communication I/F 3006 as a parallel interface for communication between the control circuit and the host device 51 according to the IEEE 1284 standards, and a head driver 3007 which converts a head print signal outputted from the gate array 3003 into an electric signal to drive the printhead 3010.

Further, the control circuit 3013 has a CR motor driver 3008 which converts the carrier motor control pulse outputted from the gate array 3003 into an electric signal to actually drive the carrier (CR) motor 3011, and an LF motor driver 3009 which converts a linefeed motor control pulse outputted from the MCU 3001 into an electric signal to actually drive the linefeed motor.

Next, a particular structure of the image output device 52 will be described.

Figure 3:
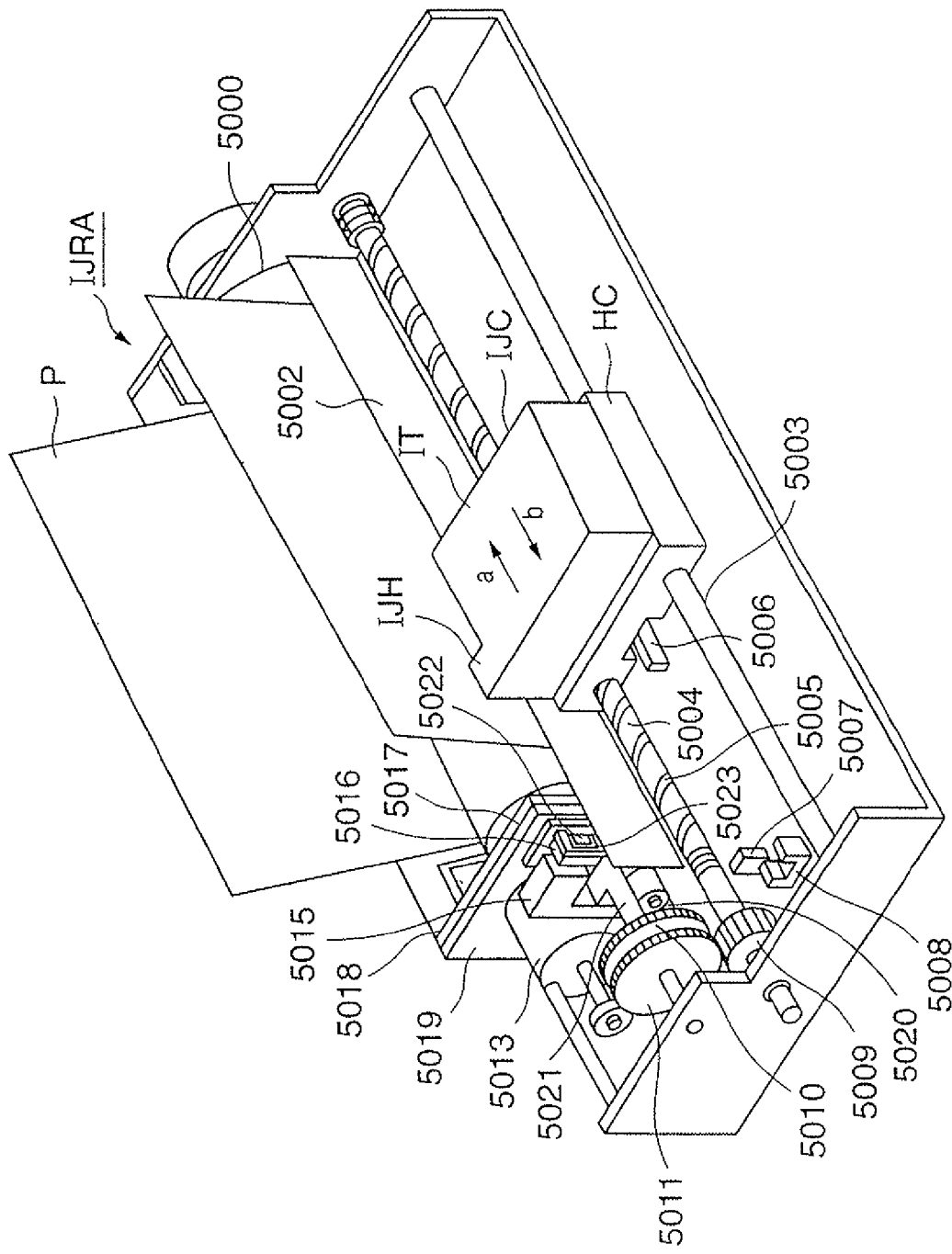
FIG. 3 is a perspective view of an ink-jet printer IJRA as a typical embodiment of the image output device 52.

FIG. 3 is a perspective view of an ink-jet printer IJRA as a typical embodiment of the image output device 52.

In FIG. 3, a carriage HC is engaged with a spiral groove 5004 of a lead screw 5005 which rotates via drive force transmission gears 5009 to 5011 interlocking with forward/reverse rotation of a driving motor 5013. The carriage HC has a pin (not shown) and it reciprocates in directions indicated by arrows a and b, held by a guide rail 5003. The carriage HC has an ink-jet cartridge IJC which integrally comprises a printhead IJH and an ink tank IT. A paper holding plate 5002 presses a print sheet P against a platen 5000 along the moving direction of the carriage HC. Photocouplers 5007 and 5008 are home position detecting members for checking the existence of lever 5006 of the carriage in this area and changing over the rotational direction of the motor 5013. A support member 5016 supports a cap member 5022 for capping the front surface of the printhead IJH. A suction member 5015 performs suction-recovery of the printhead by sucking the inside of the cap member 5022 via a cap inner opening 5023. Member 5019 allows a cleaning blade 5017 to move in back-and-forth directions. A main body support plate 5018 supports the member 5019 and the cleaning blade 5017. It is apparent that any well-known cleaning blade is applicable to the printer of the embodiment. Numeral 5021 denotes a lever for starting the sucking operation of the suction-recovery. The lever 5021 moves along the movement of a cam 5020 engaged with the carriage HC. A well-known transmission mechanism such as clutch change over controls a drive force from the driving motor.

When the carriage HC is at the home position area, a desired one of these capping, cleaning and suction-recovery is executed at its corresponding position by the lead screw 5005. The timing of any of these processings is not limited to the printer of the embodiment, if a desired processing is performed at a well-known timing.

Note that as described above, the ink tank IT and the printhead IJH may be integrally formed as an exchangeable ink cartridge IJC. Further, it may be arranged such that the ink tank IT and the printhead IJH can be separated, and when ink is exhausted, only the ink tank IT is exchanged for new one.

Further, the control circuit described above with reference to FIG. 2 is included in the ink-jet printer IJRA.

The printhead IJH prints a color image by using at least four color inks of yellow (Y), magenta (M), cyan (C) and black (K) based on multivalued density data of respective YMCK components.

2. Outline of Software Construction and Outline of Image Processing

Figure 4:
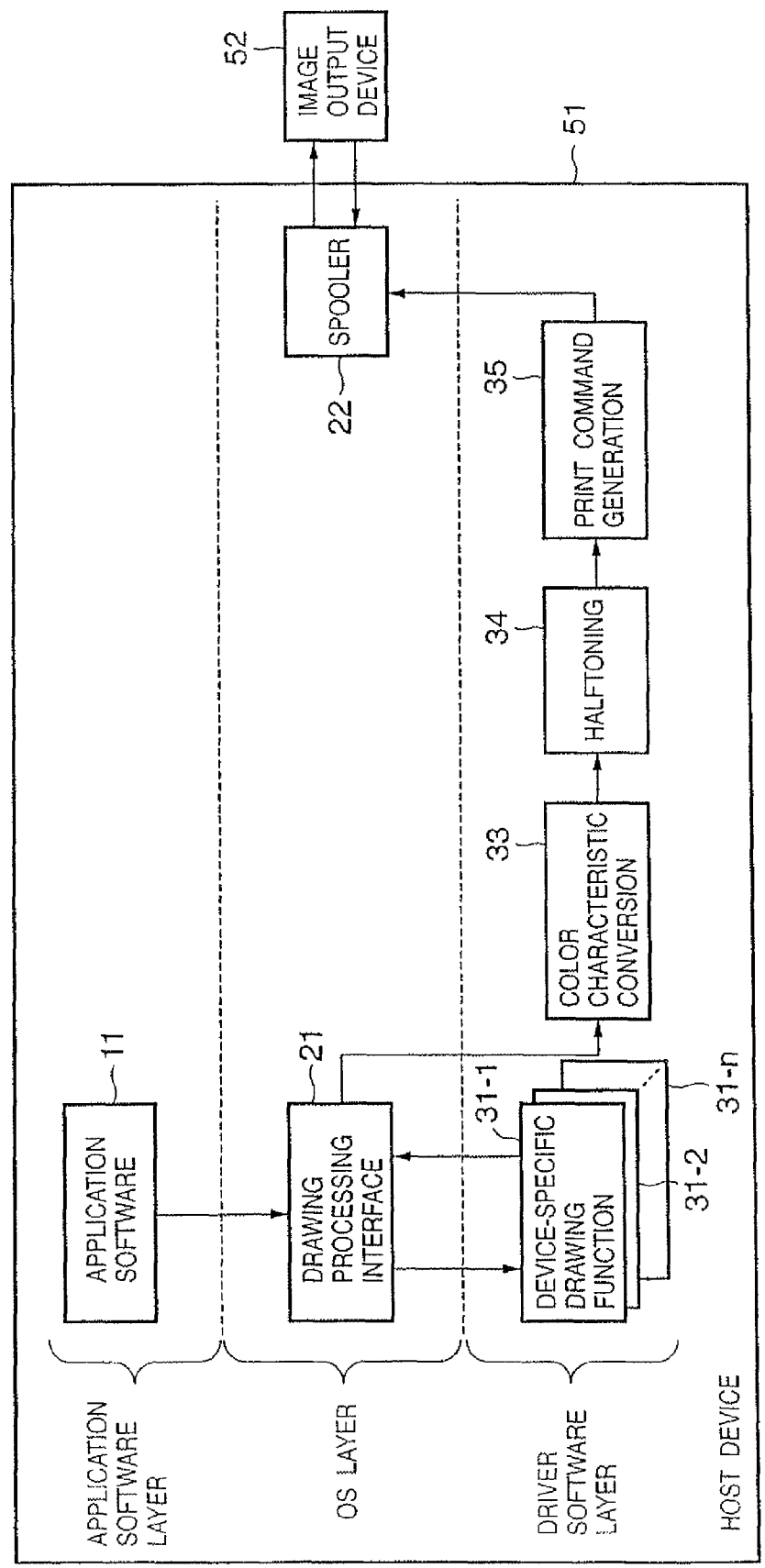
FIG. 4 is a block diagram showing a software construction used in the information processing system.

FIG. 4 is a block diagram showing the software construction used in the above-described information processing system.

As it is understood from FIG. 4, to output print data to the image output device 52, the host device 51 performs image processing by collaborated operation among application software, an operating system and driver software in a layer structure.

In the present embodiment, processings individually depending on the image output devices are handled by device-specific drawing functions 31-1, 31-2, . . . , 31-n, separated from a program for generally executing programs depending on individual implementations of image processing apparatus. Further, the core processing of driver software is independent of the individual image output devices.

A line-segmented image converted into a quantized amount is subjected to image processing by a color characteristic conversion module 33, a halftoning module 34 and the like. Further, a print command generation module 35 adds a command to the data and compresses the data, and delivers the generated data to the image output device 52 via a spooler 22 provided in the OS (Operating System).

As shown in FIG. 4, application software 11 is provided in the layer of application software, and a drawing processing interface 21 which receives a drawing command from the application software 11 and the spooler 22 which delivers the generated image data to the image output device 52 such as an ink-jet printer are provided in the layer of the OS (Operating System).

Then, the device-specific drawing functions 31-1, 31-2, . . . , 31-n holding representation formats specific to the image output devices, the color characteristic conversion module 33 which receives line-segmented image information from the OS and which converts the color representation in the driver to a device-specific color representation, a halftoning module 34 which performs conversion to quantized amounts for representing respective pixel states of the device, and the print command generation module 35 which adds a command to the image output device 52 to the halftoning-processed image data, and outputs the data to the spooler 22, are provided in the layer of driver software.

Figure 5:
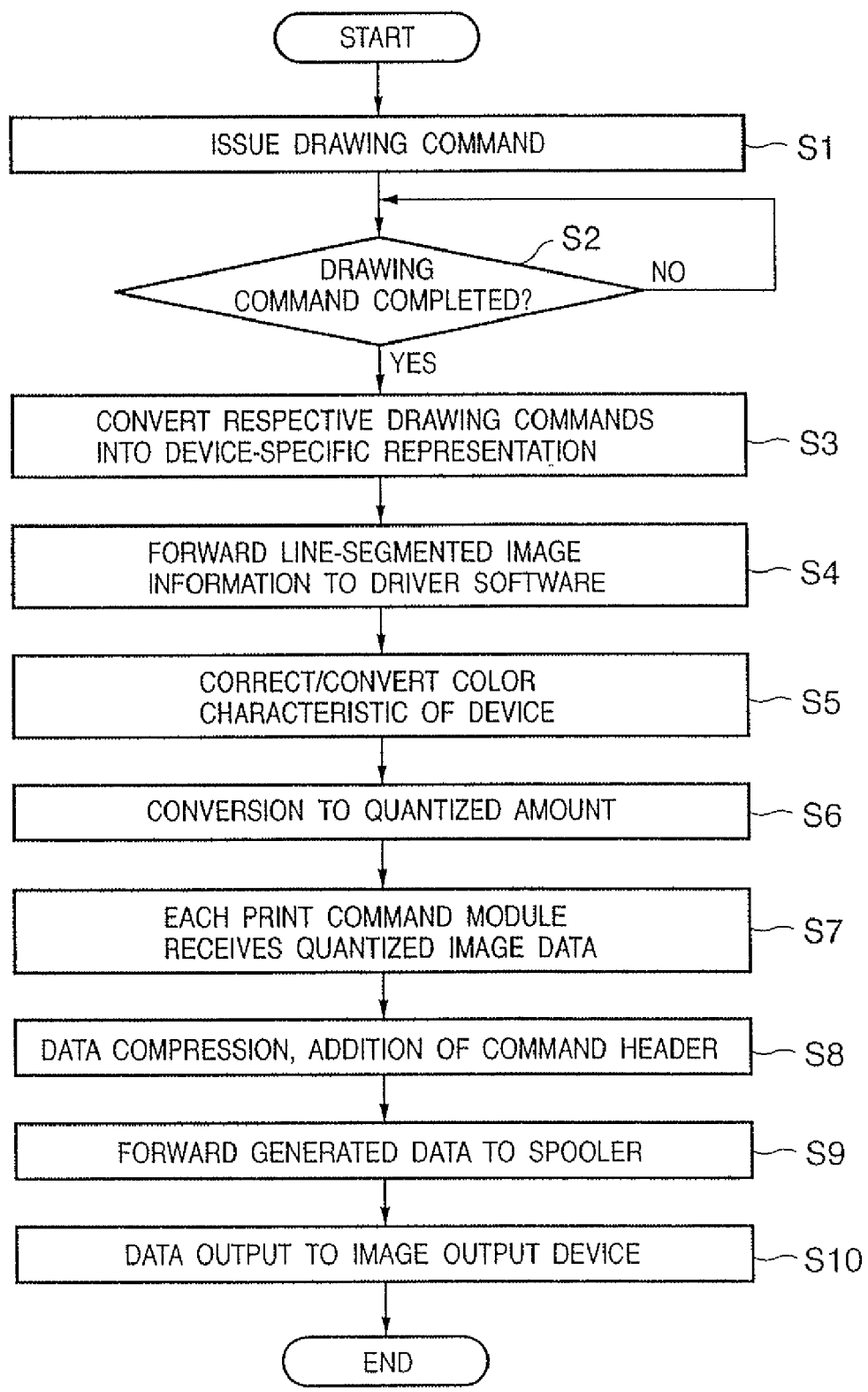
FIG. 5 is a flowchart showing the outline of image processing.

Next, a particular example of image output from the application software to the image output device 52 will be described with reference to the flowchart of FIG. 5 showing the outline of the image processing together with FIG. 4.

When the application software 11 outputs an image to the image output device 52, first, the application software 11 issues drawing commands to draw character(s), line(s), figure(s), bitmap(s) and the like, through the drawing processing interface 21 of the OS (step S1).

When the drawing commands for constructing an image frame/printing area have been completed (step S2), the OS converts the respective drawing commands in the internal format of the OS into a device-specific representation format (line-segmentation of respective drawing unit information) while calling the device-specific drawing functions 31-1, 31-2, . . . , 31-n inside the driver software (step S3), thereafter, delivers the image information line-segmented from the image frame/printing area to the driver software (step S4).

Inside the driver software, the color characteristic conversion module 33 corrects the color characteristic of the device, and converts the color representation inside the driver software to that specific to the device (step S5), further, the halftoning module 34 performs conversion (halftoning) to a quantized amounts for representing respective pixel states of the device (step S6). Note that the conversion to quantized amount here corresponds to the form of data processed by the image output device 52. If printing by the image output device is performed based on e.g. binary data, binarization is performed, and if printing by the image output device is performed based on multivalue data (for printing by using thick/thin inks and printing by using large-sized and small-sized ink droplets), the data is N-ary-converted.

The details of the halftoning will be described in the subsequent embodiments.

The print command generation module 35 receives quantized (binarized/N-ary-converted) image data (step S7). The print command generation module 35 processes the quantized image information in correspondence with the characteristic of the image output device by different methods. Further, the print command generation module 35 compresses the data and adds a command header to the data (step S8).

Thereafter, the print command generation module 35 forwards the generated data to the spooler 22 provided in the OS (step S9), to output the data to the image output device 52 (step S10).

Note that in the present embodiment, the above-described control method is realized by storing a program according to the flowchart of FIG. 5 into the storage device of the host device 51 and executing the program.

As described above, as the core processing of the driver software is independent of individual image output devices, the distribution of data processing between the driver software and the image output device can be flexibly changed without impairing the construction of the driver software. This is advantageous in view of maintenance and management of the software.

Next, several embodiments using the system according to the above-described common embodiment will be described. In the following embodiments, the details of error diffusion processing performed by the halftoning module 34 will be described.

Note that the error diffusion processing to be described below handles multivalued image data where respective pixels are represented by respectively 8-bit (256 level representation) density data of yellow (Y) component, magenta (M) component, cyan (C) component and black (K) component.

First Embodiment

In this embodiment, error diffusion processing, different from the error diffusion processing of the conventional art, capable of complicated threshold condition processing will be described. The processing handles C and M component multivalued image data.

In the present embodiment, multivalued density data is binarized by the error diffusion processing.

Figure 6:
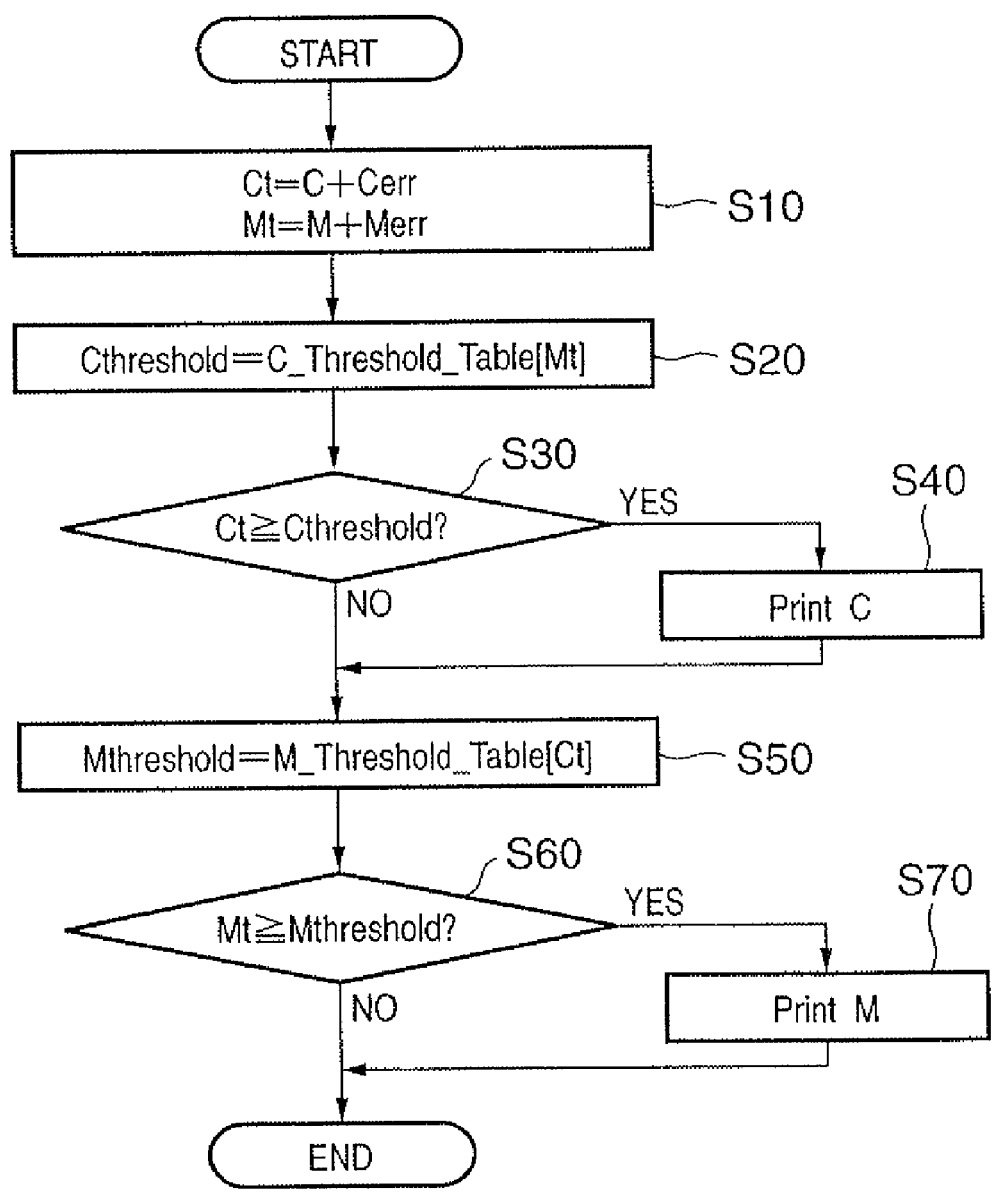
FIG. 6 is a flowchart showing image formation control according to a first embodiment of the present invention.

FIG. 6 is a flowchart showing image formation control according to the first embodiment of the present invention.

Hereinbelow, the feature of the present embodiment will be described with reference to the flowchart.

First, at step S10, the density values Ct and Mt of the C and M components of pixel of interest are obtained as in the case of the conventional art. Next, at step S20, a threshold value (C threshold) used in error diffusion of the C component is obtained based on the obtained M component density value Mt. More specifically, in this embodiment, threshold tables as shown in Tables 1 and 2 are prepared in the HDD 2002 or the DRAM 1003 of the host device 52 in advance, and the threshold value is determined by referring to the threshold tables.

At step S30, the threshold value (C threshold) obtained at step S20 is compared with the density value Ct of the pixel of interest. If Ct≧0 threshold holds, the process proceeds to step S40, at which setting is made for printing with C ink. Thereafter, the process proceeds to step S50. On the other hand, if Ct<C threshold holds at step S30, process skips step S40 and proceeds to step S50.

At step S50, a threshold value (M threshold) used in error diffusion of the M component is obtained based on the obtained C component density value Ct. More specifically, in this embodiment, the threshold tables as shown in Tables 1 and 2 are prepared in the HDD 2002 or the DRAM 1003 of the host device 52 in advance, and the threshold value is determined by referring to the threshold tables.

Accordingly, in this embodiment, both of the threshold tables as shown in Tables 1 and 2 are commonly used for the C component and the M component.

At step S60, the threshold value (M threshold) obtained at step S50 is compared with the density value Mt of the pixel of interest. If Mt≧M threshold holds, the process proceeds to step S70, at which setting is made for printing with M ink. Thereafter, the process ends. On the other hand, if Mt<M threshold holds at step S60, process skips step S70 and the proceeds ends.

Figure 24:
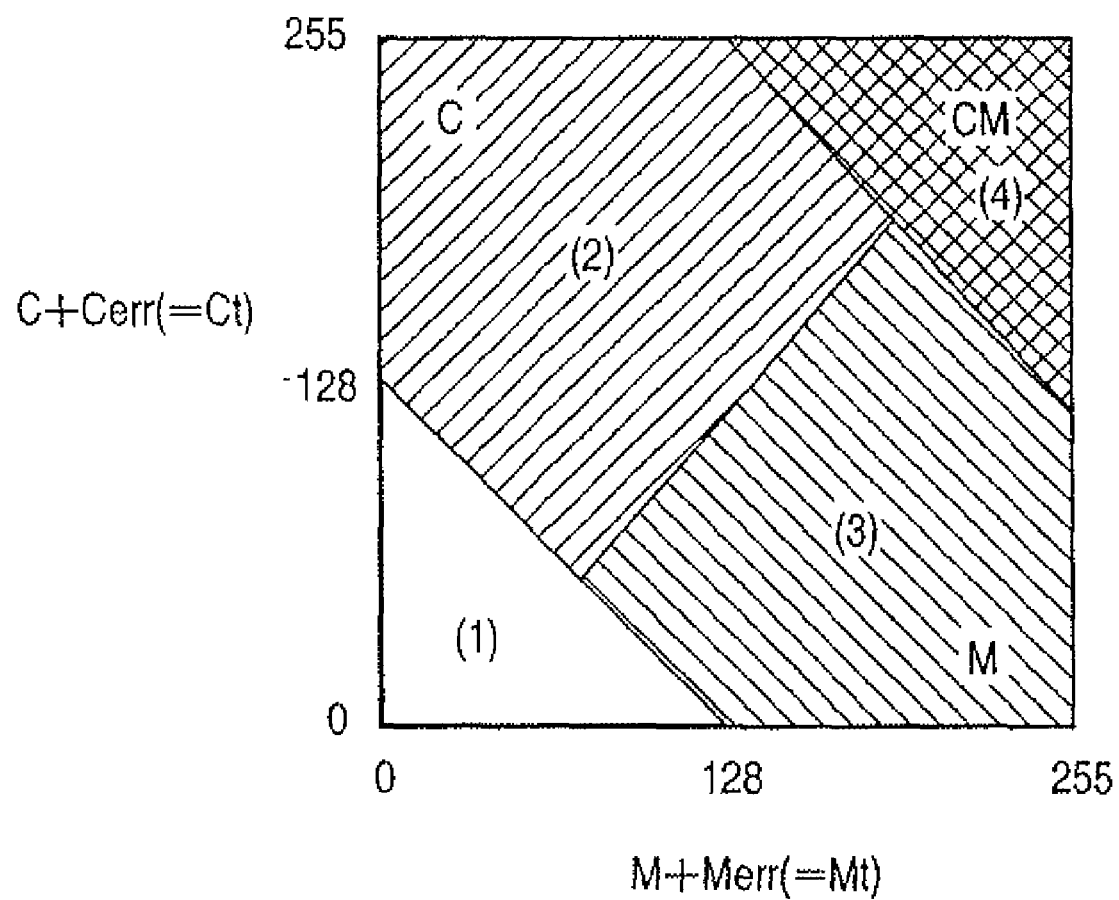
FIG. 24 is a diagram showing the image formation control according to the conventional ink-jet method.
Figure 25A:
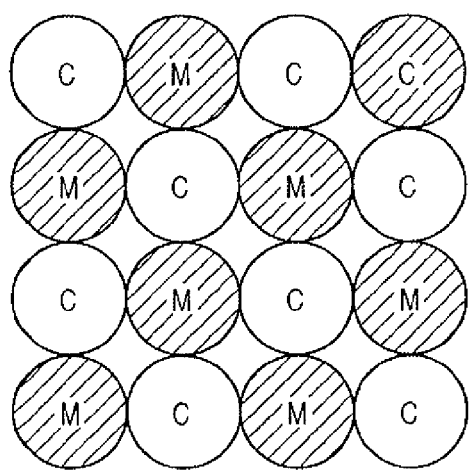
FIGS. 25A and 25B are diagrams showing image formation by exclusively arranging the C and M components.
Figure 25B:
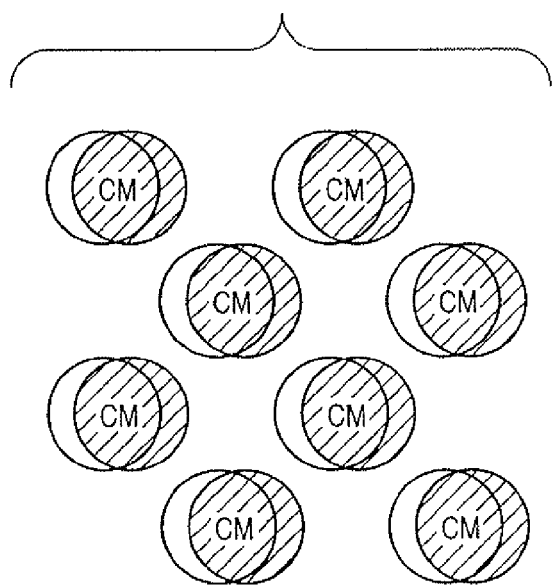

Thus, by execution of the above processing, complicated threshold setting can be made only by defining threshold tables having a common format and setting different values in the tables, in the threshold condition processing as shown in FIG. 7A similar to the threshold processing according to the conventional art described in FIG. 24, and further, in the threshold condition processing as shown in FIG. 8A with threshold conditions more complicated than those in FIG. 7A.

Table 1 is a threshold table having threshold conditions corresponding to FIG. 7A, and Table 2, a threshold table having threshold conditions corresponding to FIG. 8A.

TABLE 1

| DENSITY | THRESHOLD VALUE |
|---|---|
| 0 | 128 |
| 1 | 127 |
| 2 | 126 |
| 3 | 125 |
| 4 | 124 |
| 5 | 123 |
| 6 | 122 |
| 7 | 121 |
| 8 | 120 |
| 9 | 119 |
| 10 | 118 |
| 11 | 117 |
| 12 | 116 |
| 13 | 115 |
| 14 | 114 |
| 15 | 113 |
| 16 | 112 |
| 17 | 111 |
| 18 | 110 |
| 19 | 109 |
| 20 | 108 |
| 21 | 107 |
| 22 | 106 |
| 23 | 105 |
| 24 | 104 |
| 25 | 103 |
| 26 | 102 |
| 27 | 101 |
| 28 | 100 |
| 29 | 99 |
| 30 | 98 |
| 31 | 97 |
| 32 | 96 |
| 33 | 95 |
| 34 | 94 |
| 35 | 93 |
| 36 | 92 |
| 37 | 91 |
| 38 | 90 |
| 39 | 89 |
| 40 | 88 |
| 41 | 87 |
| 42 | 86 |
| 43 | 85 |
| 44 | 84 |
| 45 | 83 |
| 46 | 82 |

TABLE 1-continued

| DENSITY | THRESHOLD VALUE |
|---|---|
| 47 | 81 |
| 48 | 80 |
| 49 | 79 |
| 50 | 78 |
| 51 | 77 |
| 52 | 76 |
| 53 | 75 |
| 54 | 74 |
| 55 | 73 |
| 56 | 72 |
| 57 | 71 |
| 58 | 70 |
| 59 | 69 |
| 60 | 68 |
| 61 | 67 |
| 62 | 66 |
| 63 | 65 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 86 |
| 87 | 87 |
| 88 | 88 |
| 89 | 89 |
| 90 | 90 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |

TABLE 1-continued

| DENSITY | THRESHOLD VALUE |
|---|---|
| 124 | 124 |
| 125 | 125 |
| 126 | 126 |
| 127 | 127 |
| 128 | 128 |
| 129 | 129 |
| 130 | 130 |
| 131 | 131 |
| 132 | 132 |
| 133 | 133 |
| 134 | 134 |
| 135 | 135 |
| 136 | 136 |
| 137 | 137 |
| 138 | 138 |
| 139 | 139 |
| 140 | 140 |
| 141 | 141 |
| 142 | 142 |
| 143 | 143 |
| 144 | 144 |
| 145 | 145 |
| 146 | 146 |
| 147 | 147 |
| 148 | 148 |
| 149 | 149 |
| 150 | 150 |
| 151 | 151 |
| 152 | 152 |
| 153 | 153 |
| 154 | 154 |
| 155 | 155 |
| 156 | 156 |
| 157 | 157 |
| 158 | 158 |
| 159 | 159 |
| 160 | 160 |
| 161 | 161 |
| 162 | 162 |
| 163 | 163 |
| 164 | 164 |
| 165 | 165 |
| 166 | 166 |
| 167 | 167 |
| 168 | 168 |
| 169 | 169 |
| 170 | 170 |
| 171 | 171 |
| 172 | 172 |
| 173 | 173 |
| 174 | 174 |
| 175 | 175 |
| 176 | 176 |
| 177 | 177 |
| 178 | 178 |
| 179 | 179 |
| 180 | 180 |
| 181 | 181 |
| 182 | 182 |
| 183 | 183 |
| 184 | 184 |
| 185 | 185 |
| 186 | 186 |
| 187 | 187 |
| 188 | 188 |
| 189 | 189 |
| 190 | 190 |
| 191 | 191 |
| 192 | 191 |
| 193 | 190 |
| 194 | 189 |
| 195 | 188 |
| 196 | 187 |
| 197 | 186 |
| 198 | 185 |
| 199 | 184 |
| 200 | 183 |
| 201 | 182 |
| 202 | 181 |
| 203 | 180 |
| 204 | 179 |
| 205 | 178 |
| 206 | 177 |
| 207 | 176 |
| 208 | 175 |
| 209 | 174 |
| 210 | 173 |
| 211 | 172 |
| 212 | 171 |
| 213 | 170 |
| 214 | 169 |
| 215 | 168 |
| 216 | 167 |
| 217 | 166 |
| 218 | 165 |
| 219 | 164 |
| 220 | 163 |
| 221 | 162 |
| 222 | 161 |
| 223 | 160 |
| 224 | 159 |
| 225 | 158 |
| 226 | 157 |
| 227 | 156 |
| 228 | 155 |
| 229 | 154 |
| 230 | 153 |
| 231 | 152 |
| 232 | 151 |
| 233 | 150 |
| 234 | 149 |
| 235 | 148 |
| 236 | 147 |
| 237 | 146 |
| 238 | 145 |
| 239 | 144 |
| 240 | 143 |
| 241 | 142 |
| 242 | 141 |
| 243 | 140 |
| 244 | 139 |
| 245 | 138 |
| 246 | 137 |
| 247 | 136 |
| 248 | 135 |
| 249 | 134 |
| 250 | 133 |
| 251 | 132 |
| 252 | 131 |
| 253 | 130 |
| 254 | 129 |
| 255 | 128 |

TABLE 2

| DENSITY | THRESHOLD VALUE |
|---|---|
| 0 | 128 |
| 1 | 127 |
| 2 | 126 |
| 3 | 125 |
| 4 | 124 |
| 5 | 123 |
| 6 | 122 |
| 7 | 121 |
| 8 | 120 |
| 9 | 119 |
| 10 | 118 |
| 11 | 117 |
| 12 | 116 |

TABLE 2-continued

| DENSITY | THRESHOLD VALUE |
|---|---|
| 13 | 115 |
| 14 | 114 |
| 15 | 113 |
| 16 | 112 |
| 17 | 111 |
| 18 | 110 |
| 19 | 109 |
| 20 | 108 |
| 21 | 107 |
| 22 | 106 |
| 23 | 105 |
| 24 | 104 |
| 25 | 103 |
| 26 | 102 |
| 27 | 101 |
| 28 | 100 |
| 29 | 99 |
| 30 | 98 |
| 31 | 97 |
| 32 | 96 |
| 33 | 95 |
| 34 | 94 |
| 35 | 93 |
| 36 | 92 |
| 37 | 91 |
| 38 | 90 |
| 39 | 89 |
| 40 | 88 |
| 41 | 87 |
| 42 | 86 |
| 43 | 85 |
| 44 | 84 |
| 45 | 83 |
| 46 | 82 |
| 47 | 81 |
| 48 | 80 |
| 49 | 79 |
| 50 | 78 |
| 51 | 77 |
| 52 | 76 |
| 53 | 75 |
| 54 | 74 |
| 55 | 73 |
| 56 | 72 |
| 57 | 71 |
| 58 | 70 |
| 59 | 69 |
| 60 | 68 |
| 61 | 67 |
| 62 | 66 |
| 63 | 65 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 86 |
| 87 | 87 |
| 88 | 88 |
| 89 | 89 |

TABLE 2-continued

| DENSITY | THRESHOLD VALUE |
|---|---|
| 90 | 90 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |
| 128 | 128 |
| 129 | 128 |
| 130 | 128 |
| 131 | 128 |
| 132 | 128 |
| 133 | 128 |
| 134 | 128 |
| 135 | 128 |
| 136 | 128 |
| 137 | 128 |
| 138 | 128 |
| 139 | 128 |
| 140 | 128 |
| 141 | 128 |
| 142 | 128 |
| 143 | 128 |
| 144 | 128 |
| 145 | 128 |
| 146 | 128 |
| 147 | 128 |
| 148 | 128 |
| 149 | 128 |
| 150 | 128 |
| 151 | 128 |
| 152 | 128 |
| 153 | 128 |
| 154 | 128 |
| 155 | 128 |
| 156 | 128 |
| 157 | 128 |
| 158 | 128 |
| 159 | 128 |
| 160 | 128 |
| 161 | 128 |
| 162 | 128 |
| 163 | 128 |
| 164 | 128 |
| 165 | 128 |
| 166 | 128 |

TABLE 2-continued

| DENSITY | THRESHOLD VALUE |
|---|---|
| 167 | 128 |
| 168 | 128 |
| 169 | 128 |
| 170 | 128 |
| 171 | 128 |
| 172 | 128 |
| 173 | 128 |
| 174 | 128 |
| 175 | 128 |
| 176 | 128 |
| 177 | 128 |
| 178 | 128 |
| 179 | 128 |
| 180 | 128 |
| 181 | 128 |
| 182 | 128 |
| 183 | 128 |
| 184 | 128 |
| 185 | 128 |
| 186 | 128 |
| 187 | 128 |
| 188 | 128 |
| 189 | 128 |
| 190 | 128 |
| 191 | 128 |
| 192 | 128 |
| 193 | 128 |
| 194 | 128 |
| 195 | 128 |
| 196 | 128 |
| 197 | 128 |
| 198 | 128 |
| 199 | 128 |
| 200 | 128 |
| 201 | 128 |
| 202 | 128 |
| 203 | 128 |
| 204 | 128 |
| 205 | 128 |
| 206 | 128 |
| 207 | 128 |
| 208 | 128 |
| 209 | 128 |
| 210 | 128 |
| 211 | 128 |
| 212 | 128 |
| 213 | 128 |
| 214 | 128 |
| 215 | 128 |
| 216 | 128 |
| 217 | 128 |
| 218 | 128 |
| 219 | 128 |
| 220 | 128 |
| 221 | 128 |
| 222 | 128 |
| 223 | 128 |
| 224 | 128 |
| 225 | 128 |
| 226 | 128 |
| 227 | 128 |
| 228 | 128 |
| 229 | 128 |
| 230 | 128 |
| 231 | 128 |
| 232 | 128 |
| 233 | 128 |
| 234 | 128 |
| 235 | 128 |
| 236 | 128 |
| 237 | 128 |
| 238 | 128 |
| 239 | 128 |
| 240 | 128 |
| 241 | 128 |
| 242 | 128 |
| 243 | 128 |
| 244 | 128 |
| 245 | 128 |
| 246 | 128 |
| 247 | 128 |
| 248 | 128 |
| 249 | 128 |
| 250 | 128 |
| 251 | 128 |
| 252 | 128 |
| 253 | 128 |
| 254 | 128 |
| 255 | 128 |

For example, in a case where the threshold condition processing as shown in FIG. 7A is performed in accordance with the present embodiment, first, at steps S20 to S40, the threshold condition processing as shown in FIG. 7B is performed, then at steps S50 to S70, the threshold condition processing as shown in FIG. 7C is performed.

Similarly, in a case where the threshold condition processing as shown in FIG. 8A is performed in accordance with the present embodiment, first, at steps S20 to S40, the threshold condition processing as shown in FIG. 8B is performed, then at steps S50 to S70, the threshold condition processing as shown in FIG. 8C is performed.

Accordingly, in the above-described embodiment, as the threshold condition processing is performed by using a predetermined format threshold table, even if the threshold conditions are complicated as shown in FIGS. 9A to 9D, the processing can be performed in a simple manner, and as the processing is simple, the complicated threshold condition processing can be performed at a high speed.

Second Embodiment

In the first embodiment, the multivalued density data is binarized by the error diffusion processing; in the present embodiment, multivalued density data is ternarized by the error diffusion processing.

Figure 10:
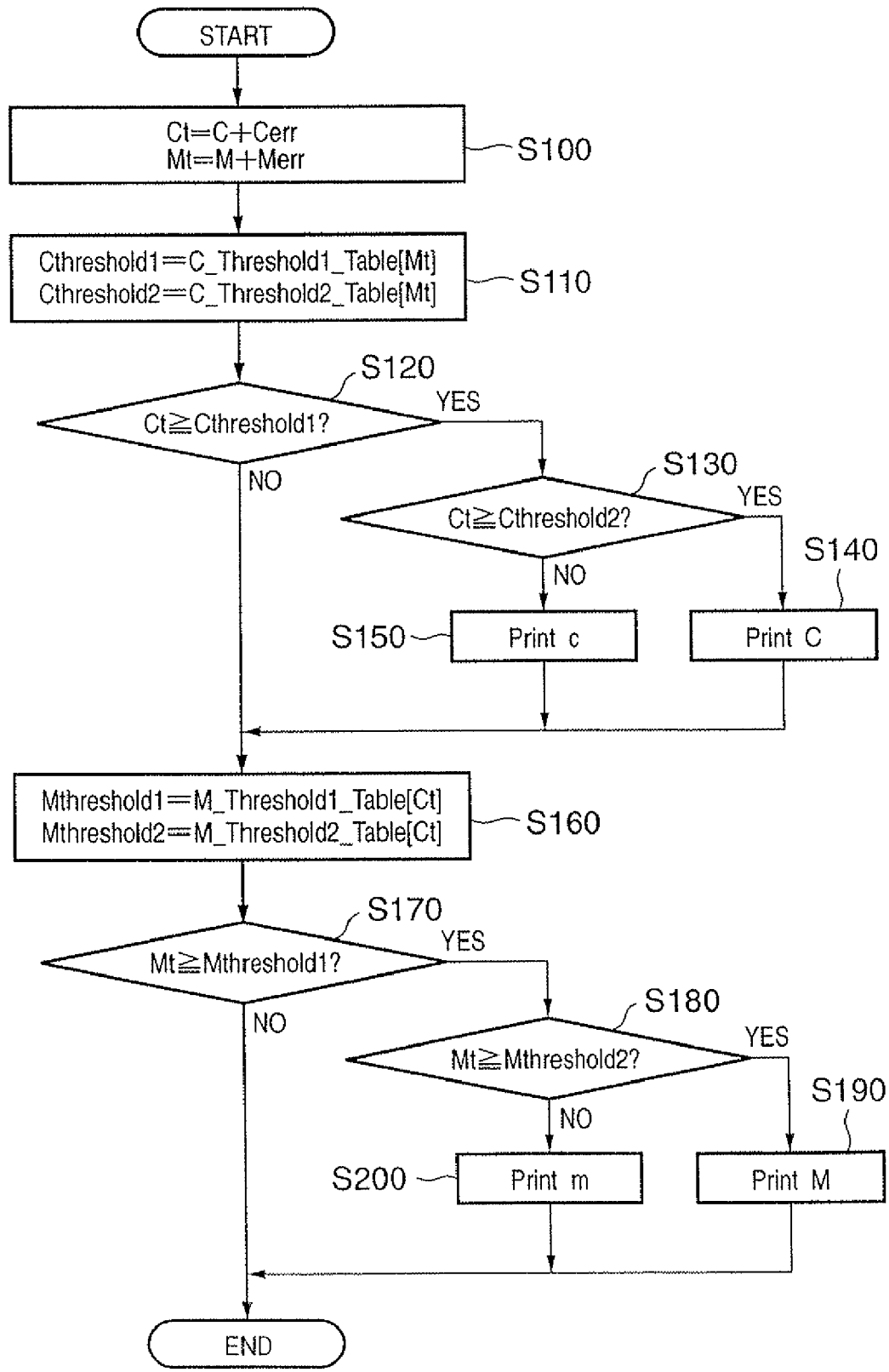
FIG. 10 is a flowchart showing the image formation control according to a second embodiment of the present invention.

FIG. 10 is a flowchart showing the image formation control according to the second embodiment of the present invention.

Hereinbelow, the feature of the present embodiment will be described with reference to the flowchart.

First, at step S100, the density values Ct and Mt of the C and M components of the pixel of interest are obtained as in the case of the conventional art. Next, at step S110, two threshold values (C threshold1 and C threshold2) used in error diffusion of the C component are obtained based on the obtained M component density value Mt. More specifically, in this embodiment, the threshold tables as shown in Tables 3 to 6 are prepared in the HDD 2002 or the DRAM 1003 of the host device 52 in advance, and the threshold values are determined by referring to the threshold tables.

At step S120, one of the threshold values (C threshold1) obtained at step S110 is compared with the density value Ct of the pixel of interest. If Ct≧C threshold1 holds, the process proceeds to step S130, which the other threshold value (C threshold2) obtained at step S110 is compared with the density value Ct of the pixel of interest. If Ct≧C threshold2 holds, the process proceeds to step S140, at which setting is made for printing by discharging large ink droplets using the C ink. Thereafter, the process proceeds to step S160. On the other hand, if Ct<C threshold2 holds at step S130, the process proceeds to step S150, at which setting is made for printing by discharging small ink droplets using the C ink. Thereafter, the process proceeds to step S160.

Further, if Ct<C threshold1 holds at step S120, the process skips steps S130 to S150 and proceeds to step S160.

At step S160, two threshold values (M threshold1 and M threshold2) used in error diffusion of the M component are obtained based on the obtained C component density value Ct. More specifically, in this embodiment, the threshold tables as shown in Tables 3 to 6 are prepared in the HDD 2002 or the DRAM 1003 of the host device 52 in advance, and the threshold values are determined by referring to the threshold tables.

Accordingly, in this embodiment, the threshold tables in Tables 3 to 6 are commonly used for the C component and the M component.

At step S170, one of the threshold values (M threshold1) obtained at step S160 is compared with the density value Mt of the pixel of interest. If Mt≧M threshold1 holds, the process proceeds to step S180, at which the other threshold value (M threshold2) obtained at step S160 is compared with the density value Mt of the pixel of interest. If Mt≧M threshold2 holds, the process proceeds to step S190, at which setting is made for printing by discharging large ink droplets using the M ink. Then, the process ends. On the other hand, if Mt<M threshold2 holds at step S180, the process proceeds to step S200, at which setting is made for printing by discharging small ink droplets using the M ink. Then the process ends.

On the other hand, if Mt<M threshold1 holds at step S170, the process skips steps S180 to S200 and the process ends.

Figure 11C:
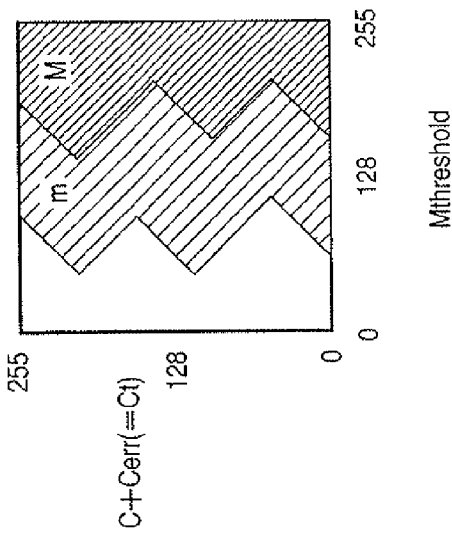
FIGS. 11A to 11C are diagrams showing threshold conditions used in the second embodiment.
Figure 11B:
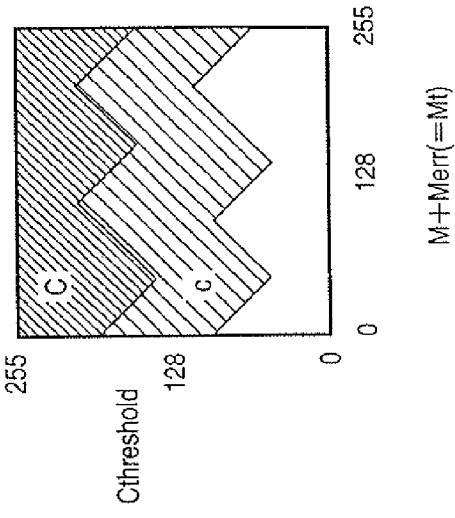
Figure 11A:
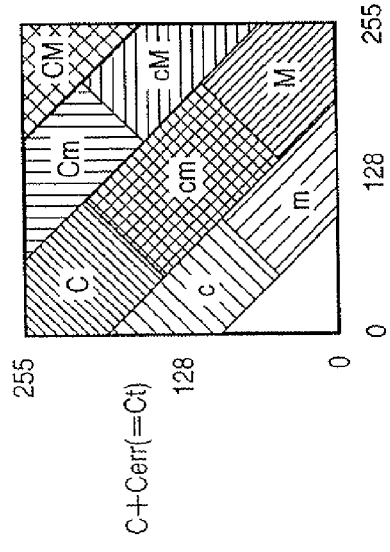
Figure 12A:
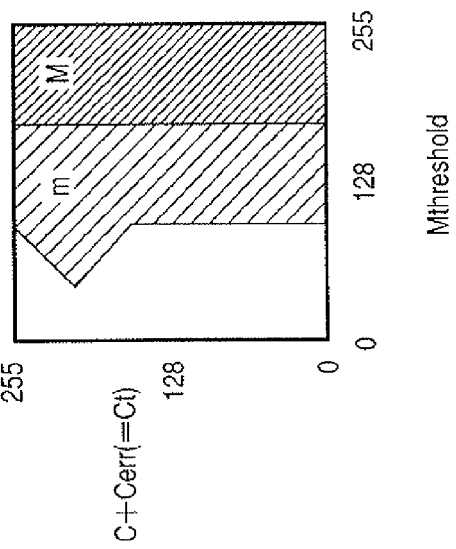
FIGS. 12A to 12C are diagrams other threshold conditions used in the second embodiment.

Thus, by execution of the above processing, complicated threshold setting can easily be made only by defining threshold tables having a common format and setting different values in the tables, in the threshold condition processing as shown in FIG. 11A, and further, in the threshold condition processing as shown in FIG. 12A.

Tables 3 and 4 are threshold tables having threshold conditions corresponding to FIG. 11A, and Tables 5 and 6, threshold tables having threshold conditions corresponding to FIG. 12A.

TABLE 3

| DENSITY | THRESHOLD VALUE |
| --- | --- |
| 0 | 85 |
| 1 | 84 |
| 2 | 83 |
| 3 | 82 |
| 4 | 81 |
| 5 | 80 |
| 6 | 79 |
| 7 | 78 |
| 8 | 77 |
| 9 | 76 |
| 10 | 75 |
| 11 | 74 |
| 12 | 73 |
| 13 | 72 |
| 14 | 71 |
| 15 | 70 |
| 16 | 69 |
| 17 | 68 |
| 18 | 67 |
| 19 | 66 |
| 20 | 65 |
| 21 | 64 |
| 22 | 63 |
| 23 | 62 |
| 24 | 61 |
| 25 | 60 |
| 26 | 59 |

TABLE 3-continued

| DENSITY | THRESHOLD VALUE |
| --- | --- |
| 27 | 58 |
| 28 | 57 |
| 29 | 56 |
| 30 | 55 |
| 31 | 54 |
| 32 | 53 |
| 33 | 52 |
| 34 | 51 |
| 35 | 50 |
| 36 | 49 |
| 37 | 48 |
| 38 | 47 |
| 39 | 46 |
| 40 | 45 |
| 41 | 44 |
| 42 | 43 |
| 43 | 43 |
| 44 | 44 |
| 45 | 45 |
| 46 | 46 |
| 47 | 47 |
| 48 | 48 |
| 49 | 49 |
| 50 | 50 |
| 51 | 51 |
| 52 | 52 |
| 53 | 53 |
| 54 | 54 |
| 55 | 55 |
| 56 | 56 |
| 57 | 57 |
| 58 | 58 |
| 59 | 59 |
| 60 | 60 |
| 61 | 61 |
| 62 | 62 |
| 63 | 63 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 84 |
| 87 | 83 |
| 88 | 82 |
| 89 | 81 |
| 90 | 80 |
| 91 | 79 |
| 92 | 78 |
| 93 | 77 |
| 94 | 76 |
| 95 | 75 |
| 96 | 74 |
| 97 | 73 |
| 98 | 72 |
| 99 | 71 |
| 100 | 70 |
| 101 | 69 |
| 102 | 68 |
| 103 | 67 |

TABLE 3-continued

| DENSITY | THRESHOLD VALUE |
|---|---|
| 104 | 66 |
| 105 | 65 |
| 106 | 64 |
| 107 | 63 |
| 108 | 62 |
| 109 | 61 |
| 110 | 60 |
| 111 | 59 |
| 112 | 58 |
| 113 | 57 |
| 114 | 56 |
| 115 | 55 |
| 116 | 54 |
| 117 | 53 |
| 118 | 52 |
| 119 | 51 |
| 120 | 50 |
| 121 | 49 |
| 122 | 48 |
| 123 | 47 |
| 124 | 46 |
| 125 | 45 |
| 126 | 44 |
| 127 | 43 |
| 128 | 43 |
| 129 | 44 |
| 130 | 45 |
| 131 | 46 |
| 132 | 47 |
| 133 | 48 |
| 134 | 49 |
| 135 | 50 |
| 136 | 51 |
| 137 | 52 |
| 138 | 53 |
| 139 | 54 |
| 140 | 55 |
| 141 | 56 |
| 142 | 57 |
| 143 | 58 |
| 144 | 59 |
| 145 | 60 |
| 146 | 61 |
| 147 | 62 |
| 148 | 63 |
| 149 | 64 |
| 150 | 65 |
| 151 | 66 |
| 152 | 67 |
| 153 | 68 |
| 154 | 69 |
| 155 | 70 |
| 156 | 71 |
| 157 | 72 |
| 158 | 73 |
| 159 | 74 |
| 160 | 75 |
| 161 | 76 |
| 162 | 77 |
| 163 | 78 |
| 164 | 79 |
| 165 | 80 |
| 166 | 81 |
| 167 | 82 |
| 168 | 83 |
| 169 | 84 |
| 170 | 85 |
| 171 | 86 |
| 172 | 87 |
| 173 | 88 |
| 174 | 89 |
| 175 | 90 |
| 176 | 91 |
| 177 | 92 |
| 178 | 93 |
| 179 | 94 |
| 180 | 95 |
| 181 | 96 |
| 182 | 97 |
| 183 | 98 |
| 184 | 99 |
| 185 | 100 |
| 186 | 101 |
| 187 | 102 |
| 188 | 103 |
| 189 | 104 |
| 190 | 105 |
| 191 | 106 |
| 192 | 107 |
| 193 | 108 |
| 194 | 109 |
| 195 | 110 |
| 196 | 111 |
| 197 | 112 |
| 198 | 113 |
| 199 | 114 |
| 200 | 115 |
| 201 | 116 |
| 202 | 117 |
| 203 | 118 |
| 204 | 119 |
| 205 | 120 |
| 206 | 121 |
| 207 | 122 |
| 208 | 123 |
| 209 | 124 |
| 210 | 125 |
| 211 | 126 |
| 212 | 127 |
| 213 | 127 |
| 214 | 126 |
| 215 | 125 |
| 216 | 124 |
| 217 | 123 |
| 218 | 122 |
| 219 | 121 |
| 220 | 120 |
| 221 | 119 |
| 222 | 118 |
| 223 | 117 |
| 224 | 116 |
| 225 | 115 |
| 226 | 114 |
| 227 | 113 |
| 228 | 112 |
| 229 | 111 |
| 230 | 110 |
| 231 | 109 |
| 232 | 108 |
| 233 | 107 |
| 234 | 106 |
| 235 | 105 |
| 236 | 104 |
| 237 | 103 |
| 238 | 102 |
| 239 | 101 |
| 240 | 100 |
| 241 | 99 |
| 242 | 98 |
| 243 | 97 |
| 244 | 96 |
| 245 | 95 |
| 246 | 94 |
| 247 | 93 |
| 248 | 92 |
| 249 | 91 |
| 250 | 90 |
| 251 | 89 |
| 252 | 88 |
| 253 | 87 |
| 254 | 86 |
| 255 | 85 |

TABLE 4

| DENSITY | THRESHOLD VALUE |
|---|---|
| 0 | 170 |
| 1 | 169 |
| 2 | 168 |
| 3 | 167 |
| 4 | 166 |
| 5 | 165 |
| 6 | 164 |
| 7 | 163 |
| 8 | 162 |
| 9 | 161 |
| 10 | 160 |
| 11 | 159 |
| 12 | 158 |
| 13 | 157 |
| 14 | 156 |
| 15 | 155 |
| 16 | 154 |
| 17 | 153 |
| 18 | 152 |
| 19 | 151 |
| 20 | 150 |
| 21 | 149 |
| 22 | 148 |
| 23 | 147 |
| 24 | 146 |
| 25 | 145 |
| 26 | 144 |
| 27 | 143 |
| 28 | 142 |
| 29 | 141 |
| 30 | 140 |
| 31 | 139 |
| 32 | 138 |
| 33 | 137 |
| 34 | 136 |
| 35 | 135 |
| 36 | 134 |
| 37 | 133 |
| 38 | 132 |
| 39 | 131 |
| 40 | 130 |
| 41 | 129 |
| 42 | 128 |
| 43 | 128 |
| 44 | 129 |
| 45 | 130 |
| 46 | 131 |
| 47 | 132 |
| 48 | 133 |
| 49 | 134 |
| 50 | 135 |
| 51 | 136 |
| 52 | 137 |
| 53 | 138 |
| 54 | 139 |
| 55 | 140 |
| 56 | 141 |
| 57 | 142 |
| 58 | 143 |
| 59 | 144 |
| 60 | 145 |
| 61 | 146 |
| 62 | 147 |
| 63 | 148 |
| 64 | 149 |
| 65 | 150 |
| 66 | 151 |
| 67 | 152 |
| 68 | 153 |
| 69 | 154 |
| 70 | 155 |
| 71 | 156 |
| 72 | 157 |
| 73 | 158 |
| 74 | 159 |
| 75 | 160 |
| 76 | 161 |

TABLE 4-continued

| DENSITY | THRESHOLD VALUE |
|---|---|
| 77 | 162 |
| 78 | 163 |
| 79 | 164 |
| 80 | 165 |
| 81 | 166 |
| 82 | 167 |
| 83 | 168 |
| 84 | 169 |
| 85 | 170 |
| 86 | 171 |
| 87 | 172 |
| 88 | 173 |
| 89 | 174 |
| 90 | 175 |
| 91 | 176 |
| 92 | 177 |
| 93 | 178 |
| 94 | 179 |
| 95 | 180 |
| 96 | 181 |
| 97 | 182 |
| 98 | 183 |
| 99 | 184 |
| 100 | 185 |
| 101 | 186 |
| 102 | 187 |
| 103 | 188 |
| 104 | 189 |
| 105 | 190 |
| 106 | 191 |
| 107 | 192 |
| 108 | 193 |
| 109 | 194 |
| 110 | 195 |
| 111 | 196 |
| 112 | 197 |
| 113 | 198 |
| 114 | 199 |
| 115 | 200 |
| 116 | 201 |
| 117 | 202 |
| 118 | 203 |
| 119 | 204 |
| 120 | 205 |
| 121 | 206 |
| 122 | 207 |
| 123 | 208 |
| 124 | 209 |
| 125 | 210 |
| 126 | 211 |
| 127 | 212 |
| 128 | 212 |
| 129 | 211 |
| 130 | 210 |
| 131 | 209 |
| 132 | 208 |
| 133 | 207 |
| 134 | 206 |
| 135 | 205 |
| 136 | 204 |
| 137 | 203 |
| 138 | 202 |
| 139 | 201 |
| 140 | 200 |
| 141 | 199 |
| 142 | 198 |
| 143 | 197 |
| 144 | 196 |
| 145 | 195 |
| 146 | 194 |
| 147 | 193 |
| 148 | 192 |
| 149 | 191 |
| 150 | 190 |
| 151 | 189 |
| 152 | 188 |
| 153 | 187 |

TABLE 4-continued

| DENSITY | THRESHOLD VALUE |
|---|---|
| 154 | 186 |
| 155 | 185 |
| 156 | 184 |
| 157 | 183 |
| 158 | 182 |
| 159 | 181 |
| 160 | 180 |
| 161 | 179 |
| 162 | 178 |
| 163 | 177 |
| 164 | 176 |
| 165 | 175 |
| 166 | 174 |
| 167 | 173 |
| 168 | 172 |
| 169 | 171 |
| 170 | 170 |
| 171 | 171 |
| 172 | 172 |
| 173 | 173 |
| 174 | 174 |
| 175 | 175 |
| 176 | 176 |
| 177 | 177 |
| 178 | 178 |
| 179 | 179 |
| 180 | 180 |
| 181 | 181 |
| 182 | 182 |
| 183 | 183 |
| 184 | 184 |
| 185 | 185 |
| 186 | 186 |
| 187 | 187 |
| 188 | 188 |
| 189 | 189 |
| 190 | 190 |
| 191 | 191 |
| 192 | 192 |
| 193 | 193 |
| 194 | 194 |
| 195 | 195 |
| 196 | 196 |
| 197 | 197 |
| 198 | 198 |
| 199 | 199 |
| 200 | 200 |
| 201 | 201 |
| 202 | 202 |
| 203 | 203 |
| 204 | 204 |
| 205 | 205 |
| 206 | 206 |
| 207 | 207 |
| 208 | 208 |
| 209 | 209 |
| 210 | 210 |
| 211 | 211 |
| 212 | 212 |
| 213 | 212 |
| 214 | 211 |
| 215 | 210 |
| 216 | 209 |
| 217 | 208 |
| 218 | 207 |
| 219 | 206 |
| 220 | 205 |
| 221 | 204 |
| 222 | 203 |
| 223 | 202 |
| 224 | 201 |
| 225 | 200 |
| 226 | 199 |
| 227 | 198 |
| 228 | 197 |
| 229 | 196 |
| 230 | 195 |

TABLE 4-continued

| DENSITY | THRESHOLD VALUE |
|---|---|
| 231 | 194 |
| 232 | 193 |
| 233 | 192 |
| 234 | 191 |
| 235 | 190 |
| 236 | 189 |
| 237 | 188 |
| 238 | 187 |
| 239 | 186 |
| 240 | 185 |
| 241 | 184 |
| 242 | 183 |
| 243 | 182 |
| 244 | 181 |
| 245 | 180 |
| 246 | 179 |
| 247 | 178 |
| 248 | 177 |
| 249 | 176 |
| 250 | 175 |
| 251 | 174 |
| 252 | 173 |
| 253 | 172 |
| 254 | 171 |
| 255 | 170 |

TABLE 5

| DENSITY | THRESHOLD VALUE |
|---|---|
| 0 | 85 |
| 1 | 84 |
| 2 | 83 |
| 3 | 82 |
| 4 | 81 |
| 5 | 80 |
| 6 | 79 |
| 7 | 78 |
| 8 | 77 |
| 9 | 76 |
| 10 | 75 |
| 11 | 74 |
| 12 | 73 |
| 13 | 72 |
| 14 | 71 |
| 15 | 70 |
| 16 | 69 |
| 17 | 68 |
| 18 | 67 |
| 19 | 66 |
| 20 | 65 |
| 21 | 64 |
| 22 | 63 |
| 23 | 62 |
| 24 | 61 |
| 25 | 60 |
| 26 | 59 |
| 27 | 58 |
| 28 | 57 |
| 29 | 56 |
| 30 | 55 |
| 31 | 54 |
| 32 | 53 |
| 33 | 52 |
| 34 | 51 |
| 35 | 50 |
| 36 | 49 |
| 37 | 48 |
| 38 | 47 |
| 39 | 46 |
| 40 | 45 |
| 41 | 44 |
| 42 | 43 |

TABLE 5-continued

| DENSITY | THRESHOLD VALUE |
|---|---|
| 43 | 43 |
| 44 | 44 |
| 45 | 45 |
| 46 | 46 |
| 47 | 47 |
| 48 | 48 |
| 49 | 49 |
| 50 | 50 |
| 51 | 51 |
| 52 | 52 |
| 53 | 53 |
| 54 | 54 |
| 55 | 55 |
| 56 | 56 |
| 57 | 57 |
| 58 | 58 |
| 59 | 59 |
| 60 | 60 |
| 61 | 61 |
| 62 | 62 |
| 63 | 63 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 85 |
| 87 | 85 |
| 88 | 85 |
| 89 | 85 |
| 90 | 85 |
| 91 | 85 |
| 92 | 85 |
| 93 | 85 |
| 94 | 85 |
| 95 | 85 |
| 96 | 85 |
| 97 | 85 |
| 98 | 85 |
| 99 | 85 |
| 100 | 85 |
| 101 | 85 |
| 102 | 85 |
| 103 | 85 |
| 104 | 85 |
| 105 | 85 |
| 106 | 85 |
| 107 | 85 |
| 108 | 85 |
| 109 | 85 |
| 110 | 85 |
| 111 | 85 |
| 112 | 85 |
| 113 | 85 |
| 114 | 85 |
| 115 | 85 |
| 116 | 85 |
| 117 | 85 |
| 118 | 85 |
| 119 | 85 |
| 120 | 85 |
| 121 | 85 |
| 122 | 85 |
| 123 | 85 |
| 124 | 85 |
| 125 | 85 |
| 126 | 85 |
| 127 | 85 |
| 128 | 85 |
| 129 | 85 |
| 130 | 85 |
| 131 | 85 |
| 132 | 85 |
| 133 | 85 |
| 134 | 85 |
| 135 | 85 |
| 136 | 85 |
| 137 | 85 |
| 138 | 85 |
| 139 | 85 |
| 140 | 85 |
| 141 | 85 |
| 142 | 85 |
| 143 | 85 |
| 144 | 85 |
| 145 | 85 |
| 146 | 85 |
| 147 | 85 |
| 148 | 85 |
| 149 | 85 |
| 150 | 85 |
| 151 | 85 |
| 152 | 85 |
| 153 | 85 |
| 154 | 85 |
| 155 | 85 |
| 156 | 85 |
| 157 | 85 |
| 158 | 85 |
| 159 | 85 |
| 160 | 85 |
| 161 | 85 |
| 162 | 85 |
| 163 | 85 |
| 164 | 85 |
| 165 | 85 |
| 166 | 85 |
| 167 | 85 |
| 168 | 85 |
| 169 | 85 |
| 170 | 85 |
| 171 | 85 |
| 172 | 85 |
| 173 | 85 |
| 174 | 85 |
| 175 | 85 |
| 176 | 85 |
| 177 | 85 |
| 178 | 85 |
| 179 | 85 |
| 180 | 85 |
| 181 | 85 |
| 182 | 85 |
| 183 | 85 |
| 184 | 85 |
| 185 | 85 |
| 186 | 85 |
| 187 | 85 |
| 188 | 85 |
| 189 | 85 |
| 190 | 85 |
| 191 | 85 |
| 192 | 85 |
| 193 | 85 |
| 194 | 85 |
| 195 | 85 |
| 196 | 85 |

TABLE 5-continued

| DENSITY | THRESHOLD VALUE |
|---|---|
| 197 | 85 |
| 198 | 85 |
| 199 | 85 |
| 200 | 85 |
| 201 | 85 |
| 202 | 85 |
| 203 | 85 |
| 204 | 85 |
| 205 | 85 |
| 206 | 85 |
| 207 | 85 |
| 208 | 85 |
| 209 | 85 |
| 210 | 85 |
| 211 | 85 |
| 212 | 85 |
| 213 | 85 |
| 214 | 85 |
| 215 | 85 |
| 216 | 85 |
| 217 | 85 |
| 218 | 85 |
| 219 | 85 |
| 220 | 85 |
| 221 | 85 |
| 222 | 85 |
| 223 | 85 |
| 224 | 85 |
| 225 | 85 |
| 226 | 85 |
| 227 | 85 |
| 228 | 85 |
| 229 | 85 |
| 230 | 85 |
| 231 | 85 |
| 232 | 85 |
| 233 | 85 |
| 234 | 85 |
| 235 | 85 |
| 236 | 85 |
| 237 | 85 |
| 238 | 85 |
| 239 | 85 |
| 240 | 85 |
| 241 | 85 |
| 242 | 85 |
| 243 | 85 |
| 244 | 85 |
| 245 | 85 |
| 246 | 85 |
| 247 | 85 |
| 248 | 85 |
| 249 | 85 |
| 250 | 85 |
| 251 | 85 |
| 252 | 85 |
| 253 | 85 |
| 254 | 85 |
| 255 | 85 |

TABLE 6

| DENSITY | THRESHOLD VALUE |
|---|---|
| 0 | 170 |
| 1 | 170 |
| 2 | 170 |
| 3 | 170 |
| 4 | 170 |
| 5 | 170 |
| 6 | 170 |
| 7 | 170 |
| 8 | 170 |

TABLE 6-continued

| DENSITY | THRESHOLD VALUE |
|---|---|
| 9 | 170 |
| 10 | 170 |
| 11 | 170 |
| 12 | 170 |
| 13 | 170 |
| 14 | 170 |
| 15 | 170 |
| 16 | 170 |
| 17 | 170 |
| 18 | 170 |
| 19 | 170 |
| 20 | 170 |
| 21 | 170 |
| 22 | 170 |
| 23 | 170 |
| 24 | 170 |
| 25 | 170 |
| 26 | 170 |
| 27 | 170 |
| 28 | 170 |
| 29 | 170 |
| 30 | 170 |
| 31 | 170 |
| 32 | 170 |
| 33 | 170 |
| 34 | 170 |
| 35 | 170 |
| 36 | 170 |
| 37 | 170 |
| 38 | 170 |
| 39 | 170 |
| 40 | 170 |
| 41 | 170 |
| 42 | 170 |
| 43 | 170 |
| 44 | 170 |
| 45 | 170 |
| 46 | 170 |
| 47 | 170 |
| 48 | 170 |
| 49 | 170 |
| 50 | 170 |
| 51 | 170 |
| 52 | 170 |
| 53 | 170 |
| 54 | 170 |
| 55 | 170 |
| 56 | 170 |
| 57 | 170 |
| 58 | 170 |
| 59 | 170 |
| 60 | 170 |
| 61 | 170 |
| 62 | 170 |
| 63 | 170 |
| 64 | 170 |
| 65 | 170 |
| 66 | 170 |
| 67 | 170 |
| 68 | 170 |
| 69 | 170 |
| 70 | 170 |
| 71 | 170 |
| 72 | 170 |
| 73 | 170 |
| 74 | 170 |
| 75 | 170 |
| 76 | 170 |
| 77 | 170 |
| 78 | 170 |
| 79 | 170 |
| 80 | 170 |
| 81 | 170 |
| 82 | 170 |
| 83 | 170 |
| 84 | 170 |
| 85 | 170 |

TABLE 6-continued

| DENSITY | THRESHOLD VALUE |
|---|---|
| 86 | 170 |
| 87 | 170 |
| 88 | 170 |
| 89 | 170 |
| 90 | 170 |
| 91 | 170 |
| 92 | 170 |
| 93 | 170 |
| 94 | 170 |
| 95 | 170 |
| 96 | 170 |
| 97 | 170 |
| 98 | 170 |
| 99 | 170 |
| 100 | 170 |
| 101 | 170 |
| 102 | 170 |
| 103 | 170 |
| 104 | 170 |
| 105 | 170 |
| 106 | 170 |
| 107 | 170 |
| 108 | 170 |
| 109 | 170 |
| 110 | 170 |
| 111 | 170 |
| 112 | 170 |
| 113 | 170 |
| 114 | 170 |
| 115 | 170 |
| 116 | 170 |
| 117 | 170 |
| 118 | 170 |
| 119 | 170 |
| 120 | 170 |
| 121 | 170 |
| 122 | 170 |
| 123 | 170 |
| 124 | 170 |
| 125 | 170 |
| 126 | 170 |
| 127 | 170 |
| 128 | 170 |
| 129 | 170 |
| 130 | 170 |
| 131 | 170 |
| 132 | 170 |
| 133 | 170 |
| 134 | 170 |
| 135 | 170 |
| 136 | 170 |
| 137 | 170 |
| 138 | 170 |
| 139 | 170 |
| 140 | 170 |
| 141 | 170 |
| 142 | 170 |
| 143 | 170 |
| 144 | 170 |
| 145 | 170 |
| 146 | 170 |
| 147 | 170 |
| 148 | 170 |
| 149 | 170 |
| 150 | 170 |
| 151 | 170 |
| 152 | 170 |
| 153 | 170 |
| 154 | 170 |
| 155 | 170 |
| 156 | 170 |
| 157 | 170 |
| 158 | 170 |
| 159 | 170 |
| 160 | 170 |
| 161 | 170 |
| 162 | 170 |
| 163 | 170 |
| 164 | 170 |
| 165 | 170 |
| 166 | 170 |
| 167 | 170 |
| 168 | 170 |
| 169 | 170 |
| 170 | 170 |
| 171 | 170 |
| 172 | 170 |
| 173 | 170 |
| 174 | 170 |
| 175 | 170 |
| 176 | 170 |
| 177 | 170 |
| 178 | 170 |
| 179 | 170 |
| 180 | 170 |
| 181 | 170 |
| 182 | 170 |
| 183 | 170 |
| 184 | 170 |
| 185 | 170 |
| 186 | 170 |
| 187 | 170 |
| 188 | 170 |
| 189 | 170 |
| 190 | 170 |
| 191 | 170 |
| 192 | 170 |
| 193 | 170 |
| 194 | 170 |
| 195 | 170 |
| 196 | 170 |
| 197 | 170 |
| 198 | 170 |
| 199 | 170 |
| 200 | 170 |
| 201 | 170 |
| 202 | 170 |
| 203 | 170 |
| 204 | 170 |
| 205 | 170 |
| 206 | 170 |
| 207 | 170 |
| 208 | 170 |
| 209 | 170 |
| 210 | 170 |
| 211 | 170 |
| 212 | 170 |
| 213 | 170 |
| 214 | 170 |
| 215 | 170 |
| 216 | 170 |
| 217 | 170 |
| 218 | 170 |
| 219 | 170 |
| 220 | 170 |
| 221 | 170 |
| 222 | 170 |
| 223 | 170 |
| 224 | 170 |
| 225 | 170 |
| 226 | 170 |
| 227 | 170 |
| 228 | 170 |
| 229 | 170 |
| 230 | 170 |
| 231 | 170 |
| 232 | 170 |
| 233 | 170 |
| 234 | 170 |
| 235 | 170 |
| 236 | 170 |
| 237 | 170 |
| 238 | 170 |
| 239 | 170 |

TABLE 6-continued

| DENSITY | THRESHOLD VALUE |
|---|---|
| 240 | 170 |
| 241 | 170 |
| 242 | 170 |
| 243 | 170 |
| 244 | 170 |
| 245 | 170 |
| 246 | 170 |
| 247 | 170 |
| 248 | 170 |
| 249 | 170 |
| 250 | 170 |
| 251 | 170 |
| 252 | 170 |
| 253 | 170 |
| 254 | 170 |
| 255 | 170 |

For example, in a case where the threshold condition processing as shown in FIG. 11A is performed in accordance with the present embodiment, first, at steps S110 to S150, the threshold condition processing as shown in FIG. 11B is performed, then at steps S160 to S200, the threshold condition processing as shown in FIG. 11C is performed.

Figure 12B:
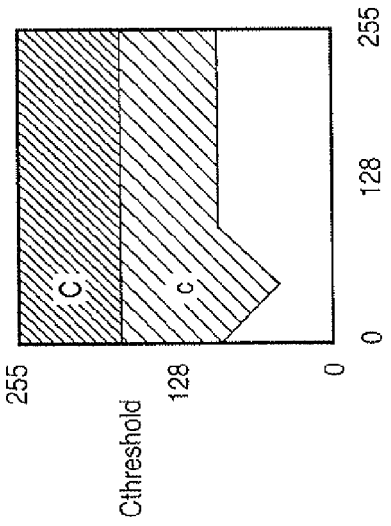
Figure 12C:
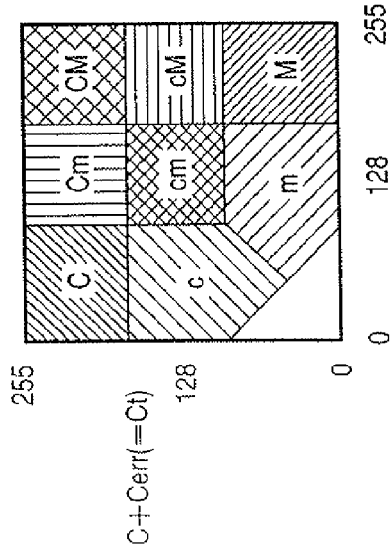

Similarly, in a case where the threshold condition processing as shown in FIG. 12A is performed in accordance with the present embodiment, first, at steps S110 to S150, the threshold condition processing as shown in FIG. 12B is performed, then at steps S160 to S200, the threshold condition processing as shown in FIG. 12C is performed. Especially, the threshold conditions shown in FIGS. 12A to 12C are effective for improvement in uniformity of halftone image.

Accordingly, in the above-described embodiment, even in ternarization of multivalued image data, as the threshold condition processing is performed by using a predetermined format threshold table, even if the threshold conditions are complicated, the processing can be performed in a simple manner, and as the processing is simple, the complicated threshold condition processing can be performed at a high speed.

Note that in the present embodiment, only ternarization is handled, however, if the ink-jet printer as the image output device is capable of handling quaternary or quinary representation by using drop modulation and same-color various density ink (e.g. thin cyan ink, thick cyan ink, thin magenta ink and thick magenta ink), threshold tables for multivalue error diffusion processing such as quaternarization or quinarization may be generated.

Third Embodiment

In the first and second embodiments, the C and M components among the multivalued density data are handled; in the present embodiment, the K component in addition to these components is handled.

Figure 13:
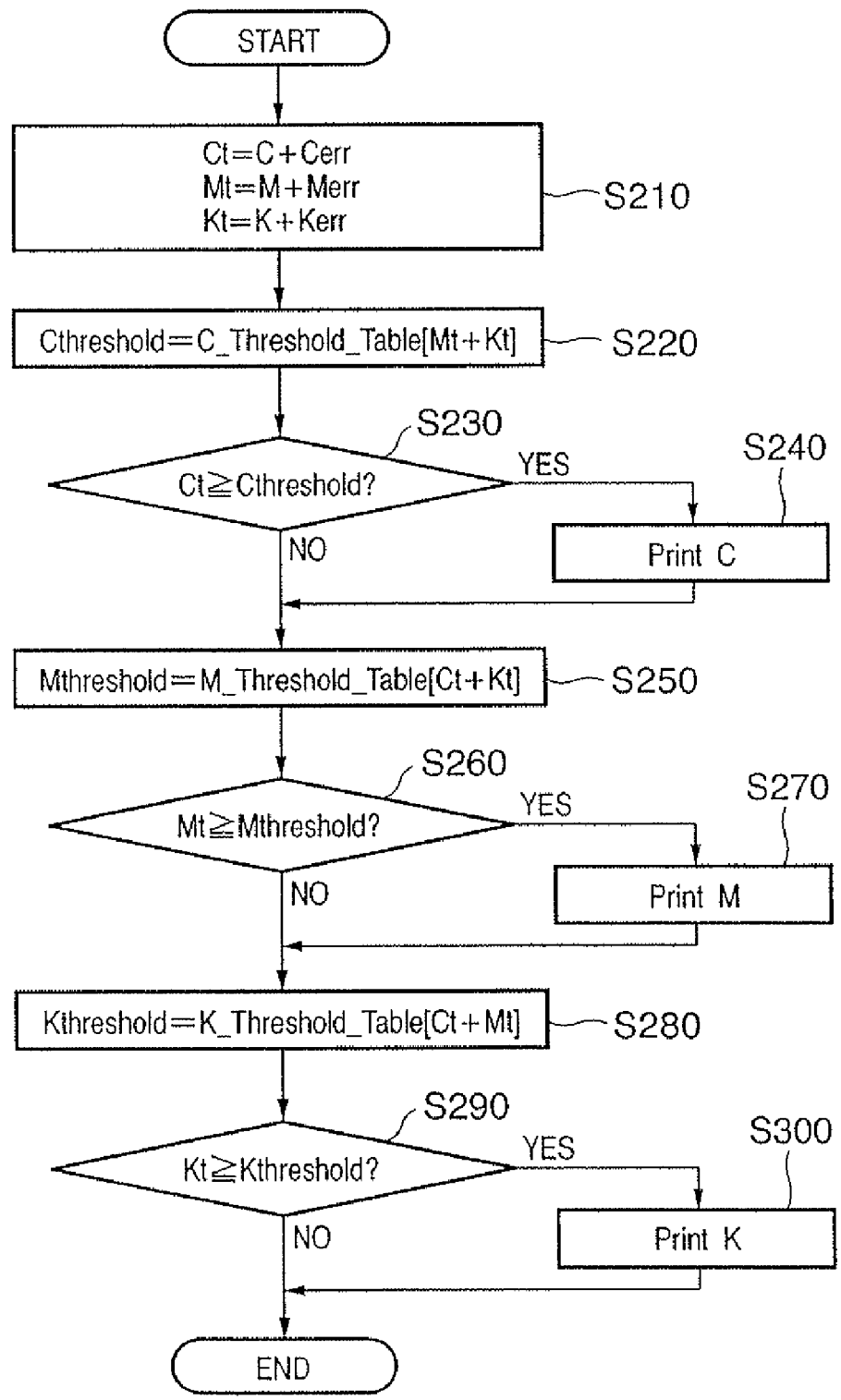
FIG. 13 is a flowchart showing the image formation control according to a third embodiment of the present invention.

FIG. 13 is a flowchart showing the image formation control according to the third embodiment of the present invention.

Hereinbelow, the feature of the present embodiment will be described with reference to the flowchart.

First, at step S210, the density values Ct, Mt and Kt of the C, M and K components of pixel of interest are obtained. Next, at step S220, a threshold value (C threshold) used in error diffusion of the C component is obtained based on the obtained M and K component density values Mt and Kt. More specifically, in this embodiment, a threshold table as shown in Table 7 is prepared in the HDD 2002 or the DRAM 1003 of the host device 52 in advance, and the threshold value is determined by referring to the threshold table.

At step S230, the threshold value (C threshold) obtained at step S220 is compared with the density value Ct of the pixel of interest. If Ct≧C threshold holds, the process proceeds to step S240, at which setting is made for printing with the C ink. Thereafter, the process proceeds to step S250. On the other hand, if Ct<C threshold holds at step S230, process skips step S240 and proceeds to step S250.

At step S250, a threshold value (M threshold) used in error diffusion of the M component is obtained based on the obtained C and K component density values Ct and Kt. More specifically, in this embodiment, a threshold table as shown in Table 7 is prepared in the HDD 2002 or the DRAM 1003 of the host device 52 in advance, and the threshold value is determined by referring to the threshold table.

At step S260, the threshold value (M threshold) obtained at step S250 is compared with the density value Mt of the pixel of interest. If Mt≧M threshold holds, the process proceeds to step S270, at which setting is made for printing with the M ink. Thereafter, the process proceeds to step S280. On the other hand, if Mt<M threshold holds at step S260, the process skips step S270 and proceeds to step S280.

Further, at step S280, a threshold value (K threshold) used in error diffusion of the K component is obtained based on the obtained C and M component density values Ct and Mt. More specifically, in this embodiment, a threshold table as shown in Table 7 is prepared in the HDD 2002 or the DRAM 1003 of the host device 52 in advance, and the threshold value is determined by referring to the threshold table.

Accordingly, in this embodiment, the threshold table in Table 7 is commonly used for the C component, the M component and the K component.

At step S290, the threshold value (K threshold) obtained at step S280 is compared with the density value Kt of the pixel of interest. If Kt≧K threshold holds, the process proceeds to step S300, at which setting is made for printing with K ink. Then, the process ends. On the other hand, if Kt<K threshold holds, the process skips step S300 and the process ends.

The code representing the core part of the above processing is as follows.

```
Ct=C+Cerr
Mt=M+Merr
Kt=K+Kerr
Cthreshold=C_Threshold_Table[Mt+Kt]
If(Ct>=Cthreshold)
Print C
Mthreshold=M_Threshold_Table[Ct+Kt]
If(Mt>=Mthreshold)
Print M
Kthreshold=M_Threshold_Table[Ct+Mt]
If (Kt>=Kthreshold)
Print K
```

By executing the above processing, the threshold condition processing for three components, which is complicated in the conventional art as explained by using program code, can easily be performed only by defining a threshold table having a common format and setting different values in the threshold table.

Table 7 is a threshold table commonly used for the C, M and K components.

TABLE 7

| DENSITY | THRESHOLD VALUE |
|---|---|
| 0 | 128 |
| 1 | 127 |
| 2 | 126 |
| 3 | 125 |
| 4 | 124 |
| 5 | 123 |
| 6 | 122 |
| 7 | 121 |
| 8 | 120 |
| 9 | 119 |
| 10 | 118 |
| 11 | 117 |
| 12 | 116 |
| 13 | 115 |
| 14 | 114 |
| 15 | 113 |
| 16 | 112 |
| 17 | 111 |
| 18 | 110 |
| 19 | 109 |
| 20 | 108 |
| 21 | 107 |
| 22 | 106 |
| 23 | 105 |
| 24 | 104 |
| 25 | 103 |
| 26 | 102 |
| 27 | 101 |
| 28 | 100 |
| 29 | 99 |
| 30 | 98 |
| 31 | 97 |
| 32 | 96 |
| 33 | 95 |
| 34 | 94 |
| 35 | 93 |
| 36 | 92 |
| 37 | 91 |
| 38 | 90 |
| 39 | 89 |
| 40 | 88 |
| 41 | 87 |
| 42 | 86 |
| 43 | 85 |
| 44 | 84 |
| 45 | 83 |
| 46 | 82 |
| 47 | 81 |
| 48 | 80 |
| 49 | 79 |
| 50 | 78 |
| 51 | 77 |
| 52 | 76 |
| 53 | 75 |
| 54 | 74 |
| 55 | 73 |
| 56 | 72 |
| 57 | 71 |
| 58 | 70 |
| 59 | 69 |
| 60 | 68 |
| 61 | 67 |
| 62 | 66 |
| 63 | 65 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 86 |
| 87 | 87 |
| 88 | 88 |
| 89 | 89 |
| 90 | 90 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |
| 128 | 128 |
| 129 | 128 |
| 130 | 128 |
| 131 | 128 |
| 132 | 128 |
| 133 | 128 |
| 134 | 128 |
| 135 | 128 |
| 136 | 128 |
| 137 | 128 |
| 138 | 128 |
| 139 | 128 |
| 140 | 128 |
| 141 | 128 |
| 142 | 128 |
| 143 | 128 |
| 144 | 128 |
| 145 | 128 |
| 146 | 128 |
| 147 | 128 |
| 148 | 128 |
| 149 | 128 |
| 150 | 128 |
| 151 | 128 |
| 152 | 128 |
| 153 | 128 |
| 154 | 128 |
| 155 | 128 |
| 156 | 128 |
| 157 | 128 |
| 158 | 128 |
| 159 | 128 |
| 160 | 128 |

| | |
|---|---|
| 161 | 128 |
| 162 | 128 |
| 163 | 128 |
| 164 | 128 |
| 165 | 128 |
| 166 | 128 |
| 167 | 128 |
| 168 | 128 |
| 169 | 128 |
| 170 | 128 |
| 171 | 128 |
| 172 | 128 |
| 173 | 128 |
| 174 | 128 |
| 175 | 128 |
| 176 | 128 |
| 177 | 128 |
| 178 | 128 |
| 179 | 128 |
| 180 | 128 |
| 181 | 128 |
| 182 | 128 |
| 183 | 128 |
| 184 | 128 |
| 185 | 128 |
| 186 | 128 |
| 187 | 128 |
| 188 | 128 |
| 189 | 128 |
| 190 | 128 |
| 191 | 128 |
| 192 | 128 |
| 193 | 128 |
| 194 | 128 |
| 195 | 128 |
| 196 | 128 |
| 197 | 128 |
| 198 | 128 |
| 199 | 128 |
| 200 | 128 |
| 201 | 128 |
| 202 | 128 |
| 203 | 128 |
| 204 | 128 |
| 205 | 128 |
| 206 | 128 |
| 207 | 128 |
| 208 | 128 |
| 209 | 128 |
| 210 | 128 |
| 211 | 128 |
| 212 | 128 |
| 213 | 128 |
| 214 | 128 |
| 215 | 128 |
| 216 | 128 |
| 217 | 128 |
| 218 | 128 |
| 219 | 128 |
| 220 | 128 |
| 221 | 128 |
| 222 | 128 |
| 223 | 128 |
| 224 | 128 |
| 225 | 128 |
| 226 | 128 |
| 227 | 128 |
| 228 | 128 |
| 229 | 128 |
| 230 | 128 |
| 231 | 128 |
| 232 | 128 |
| 233 | 128 |
| 234 | 128 |
| 235 | 128 |
| 236 | 128 |
| 237 | 128 |
| 238 | 128 |
| 239 | 128 |
| 240 | 128 |
| 241 | 128 |
| 242 | 128 |
| 243 | 128 |
| 244 | 128 |
| 245 | 128 |
| 246 | 128 |
| 247 | 128 |
| 248 | 128 |
| 249 | 128 |
| 250 | 128 |
| 251 | 128 |
| 252 | 128 |
| 253 | 128 |
| 254 | 128 |
| 255 | 128 |

Accordingly, in the above-described embodiment, as the threshold conditional processing is performed by using a predetermined format threshold table, even the error diffusion processing handling three components with complicated threshold conditions can be performed in a simple manner, and as the processing is simple, the complicated threshold condition processing can be performed at a high speed.

Further, if the present embodiment is combined with the ternarization processing of the second embodiment, the advantages of simplification and increase in processing speed can be further improved:

Note that the present invention is not limited to the threshold tables described in the above-described embodiments. If the format of the threshold table is maintained while the values set in the table are changed, processing can be performed with various threshold conditions as follows.

(1) instead of the sum of the C and M component density values (C+M), threshold conditions such as the sum of squares of the C and M component density values ($C^2+M^2$) are employed. Table 8 is a threshold table used in this case.

TABLE 8

| DENSITY | THRESHOLD VALUE |
|---|---|
| 0 | 128 |
| 1 | 127 |
| 2 | 127 |
| 3 | 127 |
| 4 | 127 |
| 5 | 127 |
| 6 | 127 |
| 7 | 127 |
| 8 | 127 |
| 9 | 127 |
| 10 | 127 |
| 11 | 127 |
| 12 | 127 |
| 13 | 127 |
| 14 | 127 |
| 15 | 127 |
| 16 | 126 |
| 17 | 126 |
| 18 | 126 |
| 19 | 126 |
| 20 | 126 |
| 21 | 126 |
| 22 | 126 |
| 23 | 125 |
| 24 | 125 |
| 25 | 125 |
| 26 | 125 |
| 27 | 125 |
| 28 | 124 |
| 29 | 124 |
| 30 | 124 |
| 31 | 124 |
| 32 | 123 |
| 33 | 123 |
| 34 | 123 |

TABLE 8-continued

| DENSITY | THRESHOLD VALUE |
|---|---|
| 35 | 123 |
| 36 | 122 |
| 37 | 122 |
| 38 | 122 |
| 39 | 121 |
| 40 | 121 |
| 41 | 121 |
| 42 | 120 |
| 43 | 120 |
| 44 | 120 |
| 45 | 119 |
| 46 | 119 |
| 47 | 119 |
| 48 | 118 |
| 49 | 118 |
| 50 | 117 |
| 51 | 117 |
| 52 | 116 |
| 53 | 116 |
| 54 | 116 |
| 55 | 115 |
| 56 | 115 |
| 57 | 114 |
| 58 | 114 |
| 59 | 113 |
| 60 | 113 |
| 61 | 112 |
| 62 | 111 |
| 63 | 111 |
| 64 | 110 |
| 65 | 110 |
| 66 | 109 |
| 67 | 109 |
| 68 | 108 |
| 69 | 107 |
| 70 | 107 |
| 71 | 106 |
| 72 | 105 |
| 73 | 105 |
| 74 | 104 |
| 75 | 103 |
| 76 | 102 |
| 77 | 102 |
| 78 | 101 |
| 79 | 100 |
| 80 | 99 |
| 81 | 99 |
| 82 | 98 |
| 83 | 97 |
| 84 | 96 |
| 85 | 95 |
| 86 | 94 |
| 87 | 93 |
| 88 | 92 |
| 89 | 91 |
| 90 | 91 |
| 91 | 91 |
| 92 | 92 |
| 93 | 93 |
| 94 | 94 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |
| 128 | 128 |
| 129 | 129 |
| 130 | 130 |
| 131 | 131 |
| 132 | 132 |
| 133 | 133 |
| 134 | 134 |
| 135 | 135 |
| 136 | 136 |
| 137 | 137 |
| 138 | 138 |
| 139 | 139 |
| 140 | 140 |
| 141 | 141 |
| 142 | 142 |
| 143 | 143 |
| 144 | 144 |
| 145 | 145 |
| 146 | 146 |
| 147 | 147 |
| 148 | 148 |
| 149 | 149 |
| 150 | 150 |
| 151 | 151 |
| 152 | 152 |
| 153 | 153 |
| 154 | 154 |
| 155 | 155 |
| 156 | 156 |
| 157 | 157 |
| 158 | 158 |
| 159 | 159 |
| 160 | 160 |
| 161 | 161 |
| 162 | 162 |
| 163 | 163 |
| 164 | 164 |
| 165 | 163 |
| 166 | 163 |
| 167 | 162 |
| 168 | 161 |
| 169 | 160 |
| 170 | 159 |
| 171 | 158 |
| 172 | 157 |
| 173 | 156 |
| 174 | 155 |
| 175 | 155 |
| 176 | 154 |
| 177 | 153 |
| 178 | 152 |
| 179 | 152 |
| 180 | 151 |
| 181 | 150 |
| 182 | 149 |
| 183 | 149 |
| 184 | 148 |
| 185 | 147 |
| 186 | 147 |
| 187 | 146 |
| 188 | 145 |

TABLE 8-continued

| DENSITY | THRESHOLD VALUE |
|---|---|
| 189 | 145 |
| 190 | 144 |
| 191 | 144 |
| 192 | 143 |
| 193 | 143 |
| 194 | 142 |
| 195 | 141 |
| 196 | 141 |
| 197 | 140 |
| 198 | 140 |
| 199 | 139 |
| 200 | 139 |
| 201 | 138 |
| 202 | 138 |
| 203 | 138 |
| 204 | 137 |
| 205 | 137 |
| 206 | 136 |
| 207 | 136 |
| 208 | 135 |
| 209 | 135 |
| 210 | 135 |
| 211 | 134 |
| 212 | 134 |
| 213 | 134 |
| 214 | 133 |
| 215 | 133 |
| 216 | 133 |
| 217 | 132 |
| 218 | 132 |
| 219 | 132 |
| 220 | 131 |
| 221 | 131 |
| 222 | 131 |
| 223 | 131 |
| 224 | 130 |
| 225 | 130 |
| 226 | 130 |
| 227 | 130 |
| 228 | 129 |
| 229 | 129 |
| 230 | 129 |
| 231 | 129 |
| 232 | 129 |
| 233 | 128 |
| 234 | 128 |
| 235 | 128 |
| 236 | 128 |
| 237 | 128 |
| 238 | 128 |
| 239 | 128 |
| 240 | 127 |
| 241 | 127 |
| 242 | 127 |
| 243 | 127 |
| 244 | 127 |
| 245 | 127 |
| 246 | 127 |
| 247 | 127 |
| 248 | 127 |
| 249 | 127 |
| 250 | 127 |
| 251 | 127 |
| 252 | 127 |
| 253 | 127 |
| 254 | 127 |
| 255 | 127 |

In a case where an ink-jet printer having a slightly greater ink discharge amount is used as the image output device, isolated dots formed by the C or M ink are easily recognized in a very low density image area, and the uniformity of the image is impaired by exclusive arrangement of these dots, if the above threshold conditions are used, the correlation between the C component and the M component can be slightly lowered and the uniformity of the image can be maintained.

Figure 9A:
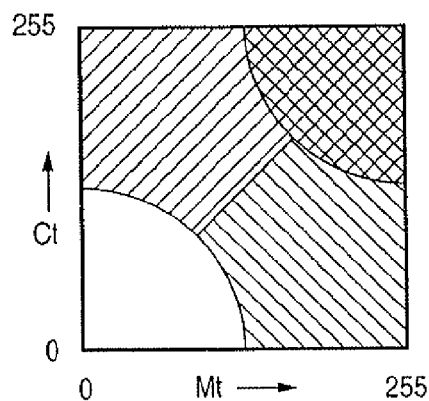
FIGS. 9A to 9D are diagrams showing examples of applicable various threshold conditions.
Figure 9B:
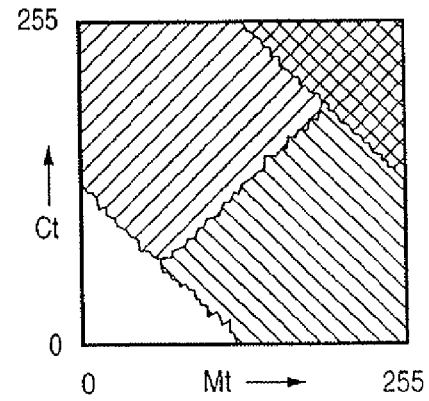

(2) As shown in FIG. 9B, threshold conditions overlapped with noise are employed. Table 9 is a threshold table used in this case.

TABLE 9

| DENSITY | THRESHOLD VALUE |
|---|---|
| 0 | 130 |
| 1 | 127 |
| 2 | 124 |
| 3 | 125 |
| 4 | 126 |
| 5 | 123 |
| 6 | 120 |
| 7 | 121 |
| 8 | 122 |
| 9 | 119 |
| 10 | 116 |
| 11 | 117 |
| 12 | 116 |
| 13 | 115 |
| 14 | 112 |
| 15 | 113 |
| 16 | 114 |
| 17 | 111 |
| 18 | 108 |
| 19 | 109 |
| 20 | 110 |
| 21 | 107 |
| 22 | 104 |
| 23 | 105 |
| 24 | 106 |
| 25 | 103 |
| 26 | 100 |
| 27 | 101 |
| 28 | 102 |
| 29 | 99 |
| 30 | 96 |
| 31 | 97 |
| 32 | 98 |
| 33 | 95 |
| 34 | 92 |
| 35 | 93 |
| 36 | 94 |
| 37 | 91 |
| 38 | 88 |
| 39 | 89 |
| 40 | 90 |
| 41 | 87 |
| 42 | 84 |
| 43 | 85 |
| 44 | 86 |
| 45 | 83 |
| 46 | 80 |
| 47 | 81 |
| 48 | 82 |
| 49 | 79 |
| 50 | 76 |
| 51 | 77 |
| 52 | 78 |
| 53 | 75 |
| 54 | 72 |
| 55 | 73 |
| 56 | 74 |
| 57 | 71 |
| 58 | 68 |
| 59 | 69 |
| 60 | 70 |
| 61 | 67 |
| 62 | 64 |
| 63 | 65 |
| 64 | 66 |
| 65 | 65 |
| 66 | 64 |
| 67 | 67 |

TABLE 9-continued

| DENSITY | THRESHOLD VALUE |
|---|---|
| 68 | 70 |
| 69 | 69 |
| 70 | 68 |
| 71 | 71 |
| 72 | 74 |
| 73 | 73 |
| 74 | 72 |
| 75 | 75 |
| 76 | 78 |
| 77 | 77 |
| 78 | 76 |
| 79 | 79 |
| 80 | 82 |
| 81 | 81 |
| 82 | 80 |
| 83 | 83 |
| 84 | 86 |
| 85 | 85 |
| 86 | 84 |
| 87 | 87 |
| 88 | 90 |
| 89 | 89 |
| 90 | 88 |
| 91 | 91 |
| 92 | 94 |
| 93 | 93 |
| 94 | 92 |
| 95 | 95 |
| 96 | 98 |
| 97 | 97 |
| 98 | 96 |
| 99 | 99 |
| 100 | 102 |
| 101 | 101 |
| 102 | 100 |
| 103 | 103 |
| 104 | 106 |
| 105 | 105 |
| 106 | 104 |
| 107 | 107 |
| 108 | 110 |
| 109 | 109 |
| 110 | 108 |
| 111 | 111 |
| 112 | 114 |
| 113 | 113 |
| 114 | 112 |
| 115 | 115 |
| 116 | 118 |
| 117 | 117 |
| 118 | 116 |
| 119 | 119 |
| 120 | 122 |
| 121 | 121 |
| 122 | 120 |
| 123 | 123 |
| 124 | 126 |
| 125 | 125 |
| 126 | 124 |
| 127 | 127 |
| 128 | 130 |
| 129 | 129 |
| 130 | 128 |
| 131 | 131 |
| 132 | 134 |
| 133 | 133 |
| 134 | 132 |
| 135 | 135 |
| 136 | 138 |
| 137 | 137 |
| 138 | 136 |
| 139 | 139 |
| 140 | 142 |
| 141 | 141 |
| 142 | 140 |
| 143 | 143 |
| 144 | 146 |
| 145 | 145 |
| 146 | 144 |
| 147 | 147 |
| 148 | 150 |
| 149 | 149 |
| 150 | 148 |
| 151 | 151 |
| 152 | 154 |
| 153 | 153 |
| 154 | 152 |
| 155 | 155 |
| 156 | 158 |
| 157 | 157 |
| 158 | 156 |
| 159 | 159 |
| 160 | 162 |
| 161 | 161 |
| 162 | 160 |
| 163 | 163 |
| 164 | 166 |
| 165 | 165 |
| 166 | 164 |
| 167 | 167 |
| 168 | 170 |
| 169 | 169 |
| 170 | 168 |
| 171 | 171 |
| 172 | 174 |
| 173 | 173 |
| 174 | 172 |
| 175 | 175 |
| 176 | 178 |
| 177 | 177 |
| 178 | 176 |
| 179 | 179 |
| 180 | 182 |
| 181 | 181 |
| 182 | 180 |
| 183 | 183 |
| 184 | 186 |
| 185 | 185 |
| 186 | 184 |
| 187 | 187 |
| 188 | 190 |
| 189 | 189 |
| 190 | 188 |
| 191 | 191 |
| 192 | 193 |
| 193 | 190 |
| 194 | 187 |
| 195 | 188 |
| 196 | 189 |
| 197 | 186 |
| 198 | 183 |
| 199 | 184 |
| 200 | 185 |
| 201 | 182 |
| 202 | 179 |
| 203 | 180 |
| 204 | 181 |
| 205 | 178 |
| 206 | 175 |
| 207 | 176 |
| 208 | 177 |
| 209 | 174 |
| 210 | 171 |
| 211 | 172 |
| 212 | 173 |
| 213 | 170 |
| 214 | 167 |
| 215 | 168 |
| 216 | 169 |
| 217 | 166 |
| 218 | 163 |
| 219 | 164 |
| 220 | 165 |
| 221 | 162 |

TABLE 9-continued

| DENSITY | THRESHOLD VALUE |
|---|---|
| 222 | 159 |
| 223 | 160 |
| 224 | 161 |
| 225 | 158 |
| 226 | 155 |
| 227 | 156 |
| 228 | 157 |
| 229 | 154 |
| 230 | 151 |
| 231 | 152 |
| 232 | 153 |
| 233 | 150 |
| 234 | 147 |
| 235 | 148 |
| 236 | 149 |
| 237 | 146 |
| 238 | 143 |
| 239 | 144 |
| 240 | 145 |
| 241 | 142 |
| 242 | 139 |
| 243 | 140 |
| 244 | 141 |
| 245 | 138 |
| 246 | 135 |
| 247 | 136 |
| 248 | 137 |
| 249 | 134 |
| 250 | 131 |
| 251 | 132 |
| 252 | 133 |
| 253 | 130 |
| 254 | 127 |
| 255 | 128 |

Figure 9C:
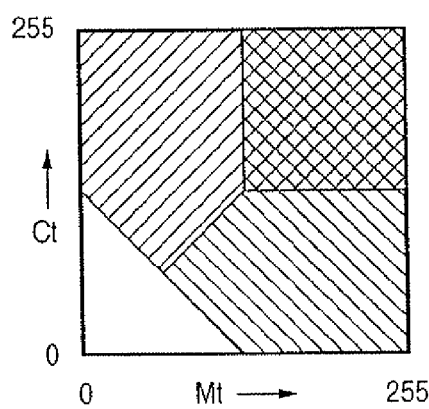
Figure 9D:
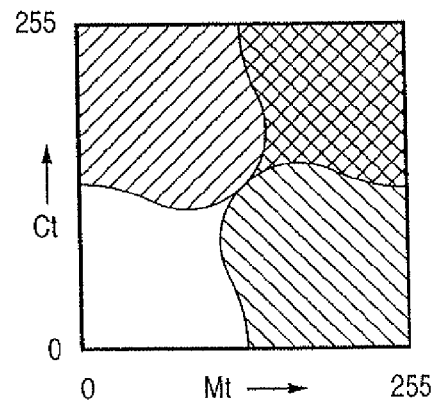

By using the threshold conditions, the probability of formation of continuous C-ink or M-ink dots can be reduced.
(3) As shown in FIG. 9C, the tendency of error diffusion is changed in a highlight area and intermediate to high density areas. By using the threshold conditions, the degradation of image quality due to fluctuation of ink dot application position can be reduced.
(4) As shown in FIG. 9D, the boundaries of thresholds are smoothed as much as possible. By using such threshold conditions, the abrupt change can be reduced between an area where C and M inks are exclusively used and an area where the C and M inks are not exclusively used, and capability of representing an image can be improved.

In this manner, the threshold condition processing has flexibility by use of a threshold table. If the threshold table is used in combination with actual ink discharge amount or ink composition in the ink-jet printer, the content of image formation processing and/or purpose of the processing can be easily changed.

Fourth Embodiment

Further, assume that the ink-jet printer IJRA can handle multivalued image data by using drop modulation and/or same-color thick and thin inks (e.g., thin cyan ink, thick cyan ink, thin magenta ink and thick magenta ink).

In the present embodiment, unlike the conventional art, multivalued density data is ternarized by the error diffusion processing. The data handled by the error diffusion processing according to this embodiment is C component and M component multivalued image data.

Figure 14:
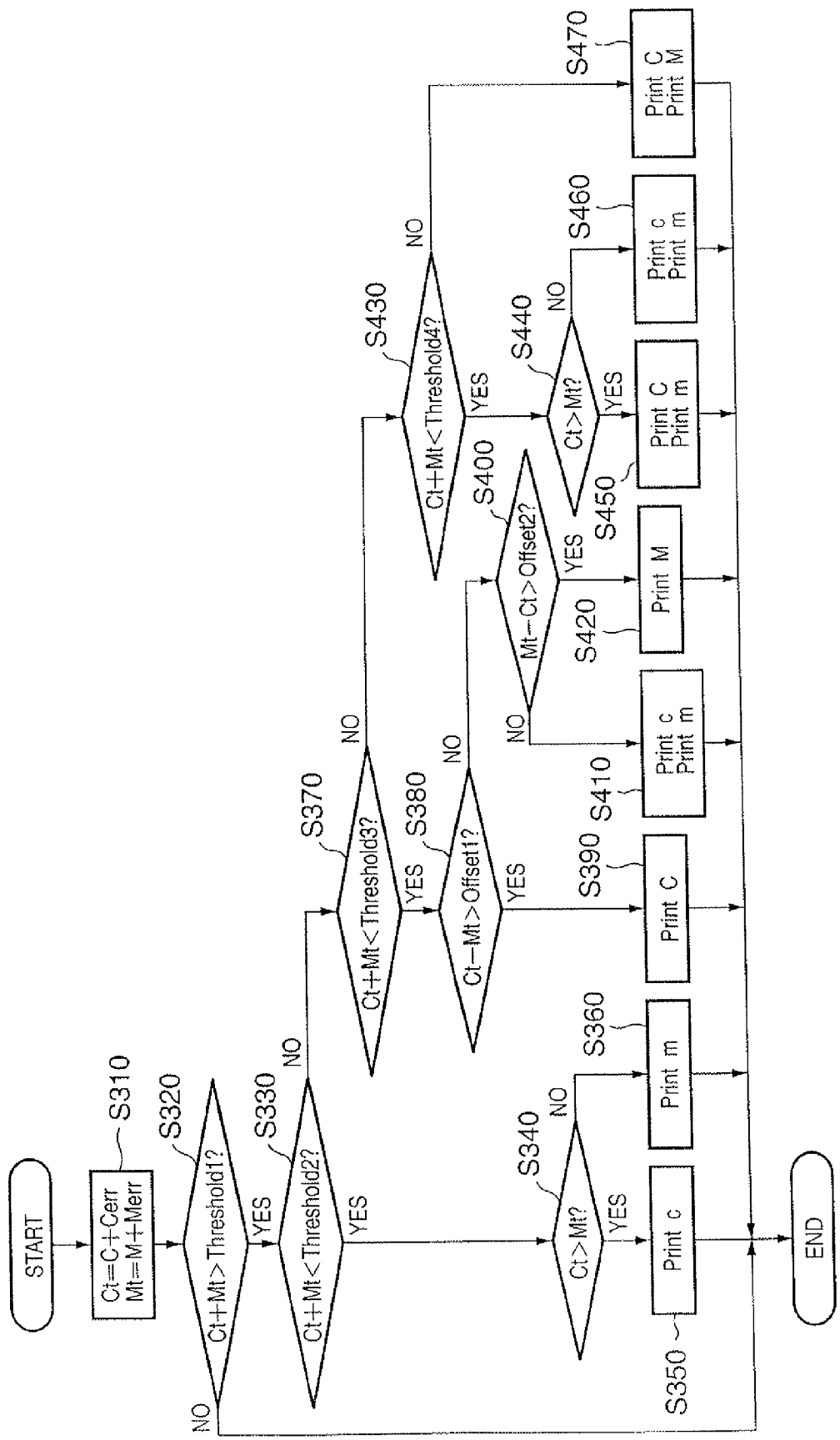
FIG. 14 is a flowchart showing the image formation control according to a fourth embodiment of the present invention.

FIG. 14 is a flowchart showing the image formation control according to the fourth embodiment of the present invention.

Hereinbelow, the feature of the present embodiment will be described with reference to the flowchart.

First, at step S310, the density values Ct and Mt of the C and M components of pixel of interest are obtained as in the case of the conventional art. Next, at step S320, it is determined whether or not the sum of the obtained M component density value Mt and the C component density value Ct is greater than a first threshold value (Threshold1). If Ct+Mt>Threshold1 holds, the process proceeds to step S330, at which it is determined whether or not the sum of the M component density value Mt and the C component density value Ct is less than a second threshold value (Threshold2). On the other hand, if Ct+Mt≦Threshold1 holds at step S320, the process ends.

At step S330, if Ct+Mt<Threshold2 holds, the process proceeds to step S340, at which the M component density value Mt and the C component density value Ct are compared with each other. If Ct>Mt holds, the process proceeds to step S350, at which setting is made for printing with small-sized C ink droplet (or thin C ink). On the other hand, if Ct≦Mt holds, the process proceeds to step S360, at which setting is made for printing with small-sized M ink droplet (or thin M ink). After step S350 or S360, the process ends.

At step S330, if Ct+Mt≧Threshold2 holds, the process proceeds to step S370, at which it is determined whether or not the sum of the M component density value Mt and the C component density value Ct is less than a third threshold value (Threshold3). If Ct+Mt<Threshold3 holds, the process proceeds to step S380, at which it is determined whether or not the difference between the M component density value Mt and the C component density value Ct is greater than a predetermined offset value (Offset1). If Ct−Mt>Offset1 holds, the process proceeds to step S390, at which setting is made for printing with large-sized C ink droplet (or thick C ink). Then, the process ends. On the other hand, if Ct−MtOffset1 holds, the process proceeds to step S400.

At step S400, it is determined whether or not the difference between the M component density value Mt and the C component density value Ct is greater than a predetermined offset value (Offset2). If Mt−CtOffset2 holds, the process proceeds to step S410, at which setting is made for printing with small-sized C ink droplet (or thin C ink) and small-sized M ink droplet (or thin M ink). Then, the process ends. On the other hand, if Mt−Ct>Offset2 holds, the process proceeds to step S420, at which setting is made for printing with large-sized M ink droplet (or thick M ink). Then, the process ends.

Further, at step S370, if Ct+Mt≧Threshold3 holds, the process proceeds to step S430, at which it is determined whether or not the sum of the M component density value Mt and the C component density value Ct is less than a fourth threshold value (Threshold4). If Ct+Mt<Threshold4 holds, the process proceeds to step S440, at which the M component density value Mt and the C component density value Ct are compared with each other. If Ct>Mt holds, the process proceeds to step S450, at which setting is made for printing with large-sized C ink droplet (or thick C ink) and small-sized M ink droplet (or thin M ink). Then the process ends. On the other hand, if Ct≦Mt holds, the process proceeds to step S460, at which setting is made for printing with small-sized C ink droplet (or thin C ink) and large-sized M ink droplet (or thick M ink). Then, the process ends.

On the other hand, at step S430, if Ct+Mt≧Threshold4 holds, the process proceeds to step S470, at which setting is made for printing with large-sized C ink droplet (or thick C ink) and large-sized M ink droplet (or thick M ink). Then, the process ends.

Figure 15:
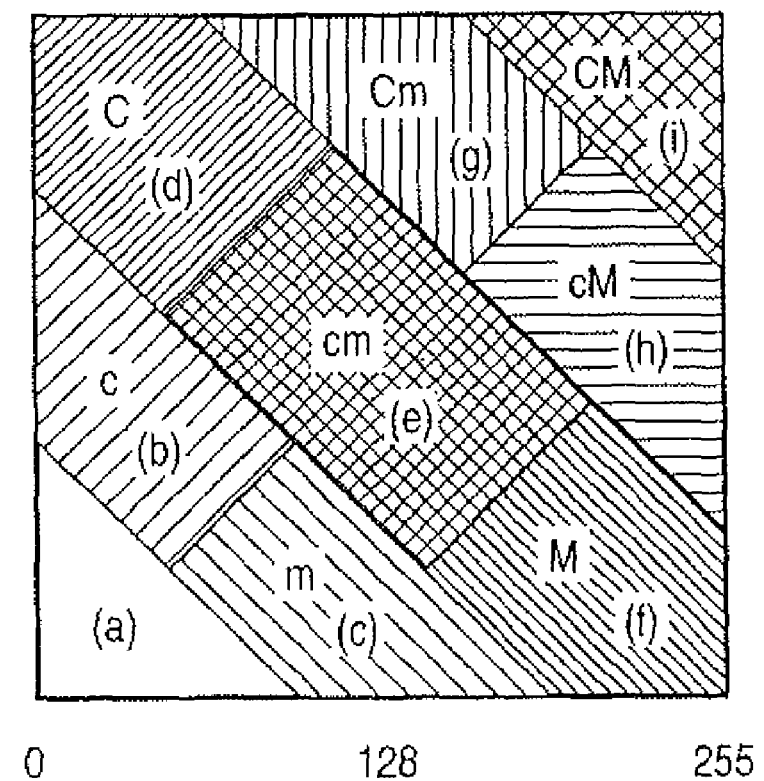
FIG. 15 is a diagram showing threshold conditions used in the fourth embodiment.

FIG. 15 shows the threshold conditions for the C and M components in the processing shown in FIG. 14.

In the above-described processing, the following dot arrangements are made in accordance with the M component density value Mt and the C component density value Ct.

(1) Ct+Mt≦Threshold1

(C and M components belong to low density area→area (a) in FIG. 15)

Dot printing is not performed.

(2) Ct+Mt>Threshold1 and Ct+Mt<Threshold2 and Ct>Mt (C component belongs to intermediate density area→area (b) in FIG. 15)

Dot printing with small-sized C ink droplet (or thin C ink) (exclusive printing).

(3) Ct+Mt>Threshold1 and Ct+Mt<Threshold2 and Ct≦Mt (M component belongs to intermediate density area→area (c) in FIG. 15)

Dot printing with small-sized M ink droplet (or thin M ink)(exclusive printing).

(4) Ct+Mt>Threshold1 and Ct+Mt≧Threshold2 and Ct+Mt<Threshold3 and Ct−Mt>Offset1

(C component belongs to high density area→area (d) in FIG. 15)

Dot printing with large-sized C ink droplet (or thick C ink) (exclusive printing).

(5) Ct+Mt>Threshold1 and Ct+Mt≧Threshold2 and Ct+Mt<Threshold3 and Ct−MtOffset1 and Mt−Ct≦Offset2

(C and M components belong to intermediate density area→area (e) in FIG. 15)

Dot printing with small-sized C ink droplet (or thin C ink) and small-sized M ink droplet (or thin M ink) (overlay printing).

(6) Ct+Mt>Threshold1 and Ct+Mt≧Threshold2 and Ct+Mt<Threshold3 and Mt−Ct≦Offset1 and Mt−Ct>Offset2

(M component belongs to high density area→area (f) in FIG. 15)

Dot printing with large-sized M ink droplet (or thick M ink)(exclusive printing).

(7) Ct+Mt>Threshold1 and Ct+Mt≧Threshold2 and Ct+Mt≧Threshold3 and Ct+Mt<Threshold4 and Ct>Mt (C component belongs to high density area and M component belongs to intermediate density area→area (g) in FIG. 15)

Dot printing with large-sized C ink droplet (or thick C ink) and small-sized M ink droplet (or thin M ink)(overlay printing).

(8) Ct+Mt>Threshold1 and Ct+Mt≧Threshold2 and Ct+Mt≧Threshold3 and Ct+Mt<Threshold4 and Ct≦Mt (C component belongs to intermediate density area and M component belongs to high density area→area (h) in FIG. 15)

Dot printing with small-sized C ink droplet (or thin C ink) and large-sized M ink droplet (or thick M ink) (overlay printing).

(9) Ct+Mt≧Threshold4

(>Threshold3>Threshold2>Threshold1)

(C and M components belong to high density area→area (i) in FIG. 15)

Dot printing with large-sized C ink droplet (or thick C ink) and large-sized M ink droplet (or thick M ink) (overlay printing).

Accordingly, in the above-described present embodiment, as the printing with the M ink and C ink is changed in accordance with the C component and M component density values, printing with reduced graininess can be performed by ternarizing the C component and M component density values and exclusively arranging printed dots based on the ternarization.

Fifth Embodiment

In the fourth embodiment, the multivalued density data is ternarized by the error diffusion processing; in the present embodiment, an example of high-speed processing in consideration of conversion of multivalued density data into N-ary code (N≧4) by the error diffusion will be described.

As it is apparent from the flowchart of FIG. 14 described in the first embodiment, in the case of ternarization, the C and M components are respectively ternarized, 9 (=3×3) arrangements are considered and branching processings by 8 "if" statements (condition statements) are required. That is, in the case of converting into N-ary code, $N^2-1$ "if" statements are required. Accordingly, as the value of N increases, processing time increases.

Figure 16:
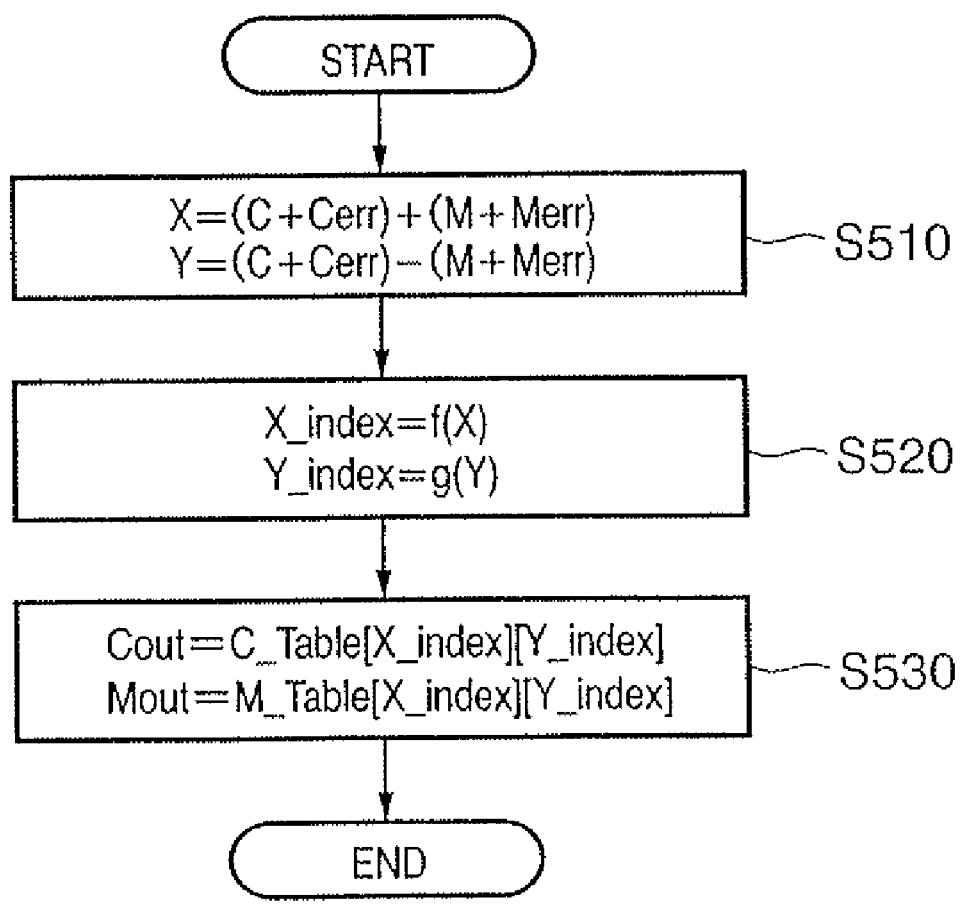
FIG. 16 is a flowchart showing the image formation control according to a fifth embodiment of the present invention.

FIG. 16 is a flowchart showing the image formation control according to the fifth embodiment of the present invention.

Hereinbelow, the feature of the present embodiment will be described with reference to the flowchart.

In the present embodiment, as the threshold condition processing is very complicated in the conversion of input multivalued image data into N-ary code (N≧3) by the error diffusion processing, the conversion is made by the following procedure.

(1) Functions defined as X=Ct+Mt and Y=Ct−Mt are introduced for execution of multivalue error diffusion.

(2) A two-dimensional table is referred to based on the result of multivalue error diffusion processing, so as to determine arrangement of dots to be printed and dot type. The two-dimensional table may be a common table for the C and M components, however, actually, it is preferable that tables (C_Table and M_Table) respectively for the C and M components are prepared.

Returning to FIG. 16, first, at step S510, X and Y values are determined from density values of the C and M components in each pixel.

Next, at step S520, arguments (X_index, Y_index) of the above-described two-dimensional table are determined based on the X and Y values. In this embodiment, the arguments are determined as X and Y functions (X_index=f(X), Y_index=g (Y)).

Finally, at step S530, the two-dimensional table is referred to by using the arguments determined at step S520, and output values by the error diffusion processing of the C and M components (C out, M out) are determined.

For comparison, an example of ternarization processing the same as that described in the fourth embodiment, in accordance with the present embodiment, will be described.

Figure 17:
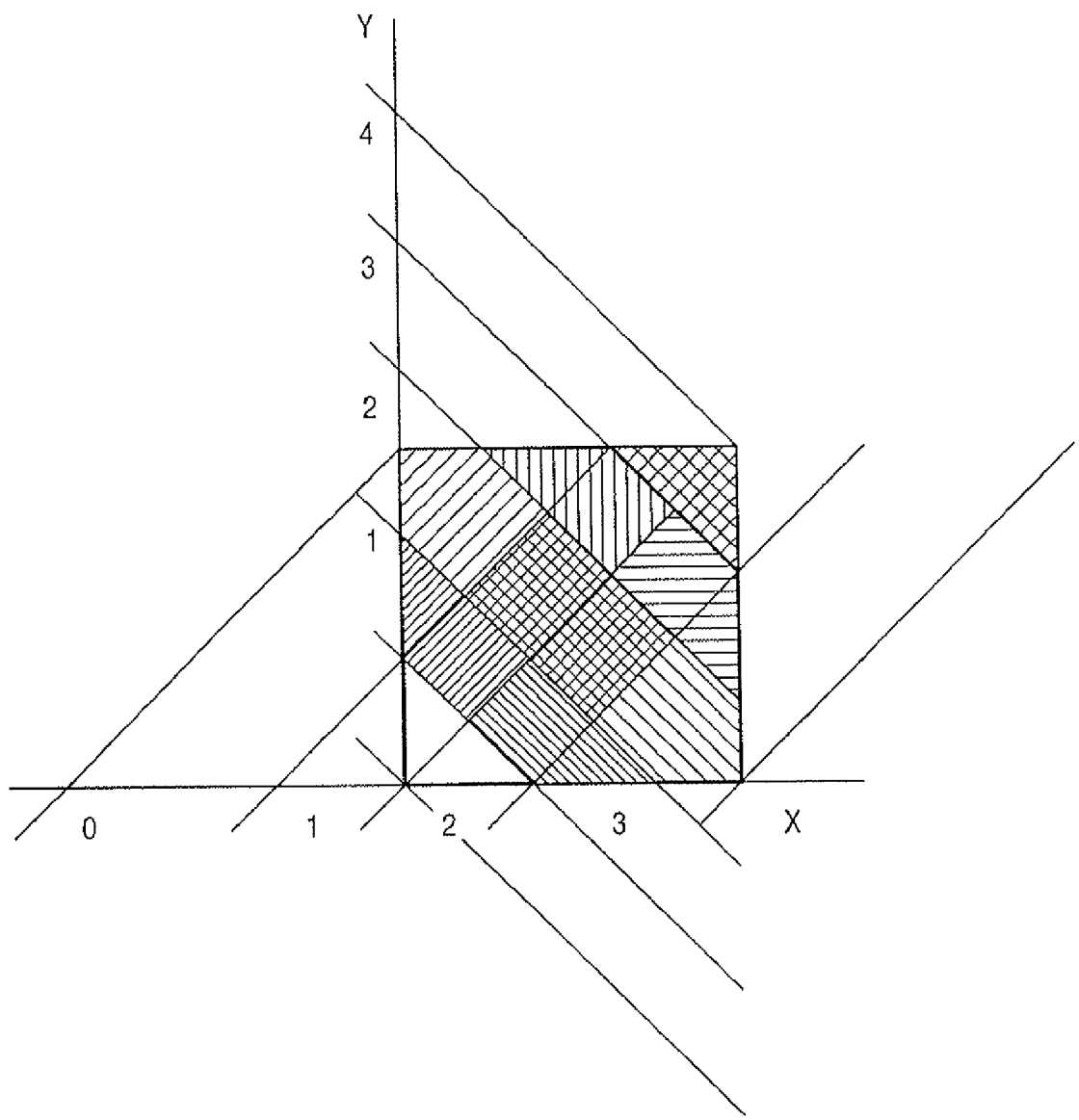
FIG. 17 is a diagram showing threshold conditions used in the fifth embodiment.

FIG. 17 shows the ternarization according to the fifth embodiment.

FIG. 17 shows quaternarization of X=Ct(=C+Cerr)+Mt (=M+Merr) and quinarization of Y=Ct(=C+Cerr)−Mt(=M+ Merr).

In FIG. 17, a right-upward straight line indicates the same X value (=Ct−Mt), and a left-upward straight line, the same Y value (=Ct+Mt) (Ct and Mt have variation widths of about −128≦Ct, Mt≦383 including error accumulation).

Accordingly, as the values Ct and Mt have the above variation widths, the X value has a variation width of about −256≦X≦766, and the Y value, a variation width of about −511≦Y≦511. To quaternarize and quinarize the X and Y values having the above variation widths, the function of X (f(X)) and that of Y (g(Y)) are introduced.

That is, X_index=f(X) and Y_index=g(Y) are calculated. The calculations can be realized by referring to the table.

In this manner, two additions and two multivalue conversion calculations (referring to the table) divide the entire X and Y range into quaternary×quinary=20 sections.

In comparison between FIGS. 17 and 15, the areas (a), (b), (c), (e), (g), (h) and (i) in FIG. 15 are respectively 2 sections in FIG. 17. The entire partitioning is approximately common to FIGS. 15 and 17.

Accordingly, print control based on the error-diffusion processing by C and M ternarization can be performed by referring to a common two-dimensional table as shown in FIG. 18 based on the results of X and Y multivalue conversion.

Note that in FIG. 18, "_" means non-execution of dot printing with C or M ink; "c", dot printing with small-sized C ink droplet (or thin C ink); "m", dot printing with small-sized M ink droplet (or thin M ink); "C", dot printing with large-sized C ink droplet (or thick C ink); "M", dot printing with large-sized M ink droplet (or thick M ink); "cm", dot printing with small-sized C ink droplet (or thin C ink) and small-sized M ink droplet (or thin M ink); "Cm", dot printing with large-sized C ink droplet (or thick C ink) and small-sized M ink droplet (or thin M ink); "cM", dot printing with small-sized C ink droplet (or thin C ink) and large-sized M ink droplet (or thick M ink); and "CM", dot printing with large-sized C ink droplet (or thick C ink) and large-sized M ink droplet (or thick M ink).

Actually, it is desirable that two-dimensional tables are prepared respectively for the C and M components in consideration of color characteristics of the C and M components, as shown in FIGS. 19A and 19B.

FIG. 19A shows a two-dimensional table specialized for the C component, and FIG. 19B, a two-dimensional table specialized for the M component.

Further, in FIGS. 19A and B, "_" means non-execution of dot printing; "c", dot printing with small-sized C ink droplet (or thin C ink); "m", dot printing with small-sized M ink droplet (or thin M ink); "C", dot printing with large-sized C ink droplet (or thick C ink); and "M", dot printing with large-sized M ink droplet (or thick M ink).

In the above example, for the sake of simplification of explanation, ternarization has been described, however, in the present embodiment, as conversion into N-ary code (N≧4) can be realized by using simple processing steps without conditional branch processing, i.e., XY calculation, XY multivalue conversion processing and multivalue conversion of the C and M components, the embodiment provides more effective processing for N of the higher-order.

Accordingly, in the above-described present embodiment, regarding conversion into N-ary code of the higher-order, the error diffusion processing can be performed at a high speed without complicated processing.

Further, according to the above-described present embodiment, as the processing is mainly performed with reference to table(s) without calculation accompanied with condition determination, the processing is advantageous in e.g. pipeline processing and/or lookahead processing used in an MPU such as an Pentium compatible processor. If such processor is employed in the present embodiment, higher-speed processing can be expected.

Sixth Embodiment

In the present embodiment, the error diffusion processing capable of controlling pixel arrangement by each density component in accordance with density value, different from the error diffusion of the conventional art, will be described. The error diffusion processing according to the present embodiment handles multivalued image data of C and M components.

In the present embodiment, the multivalued density data is binarized by the error-diffusion processing.

Figure 20:
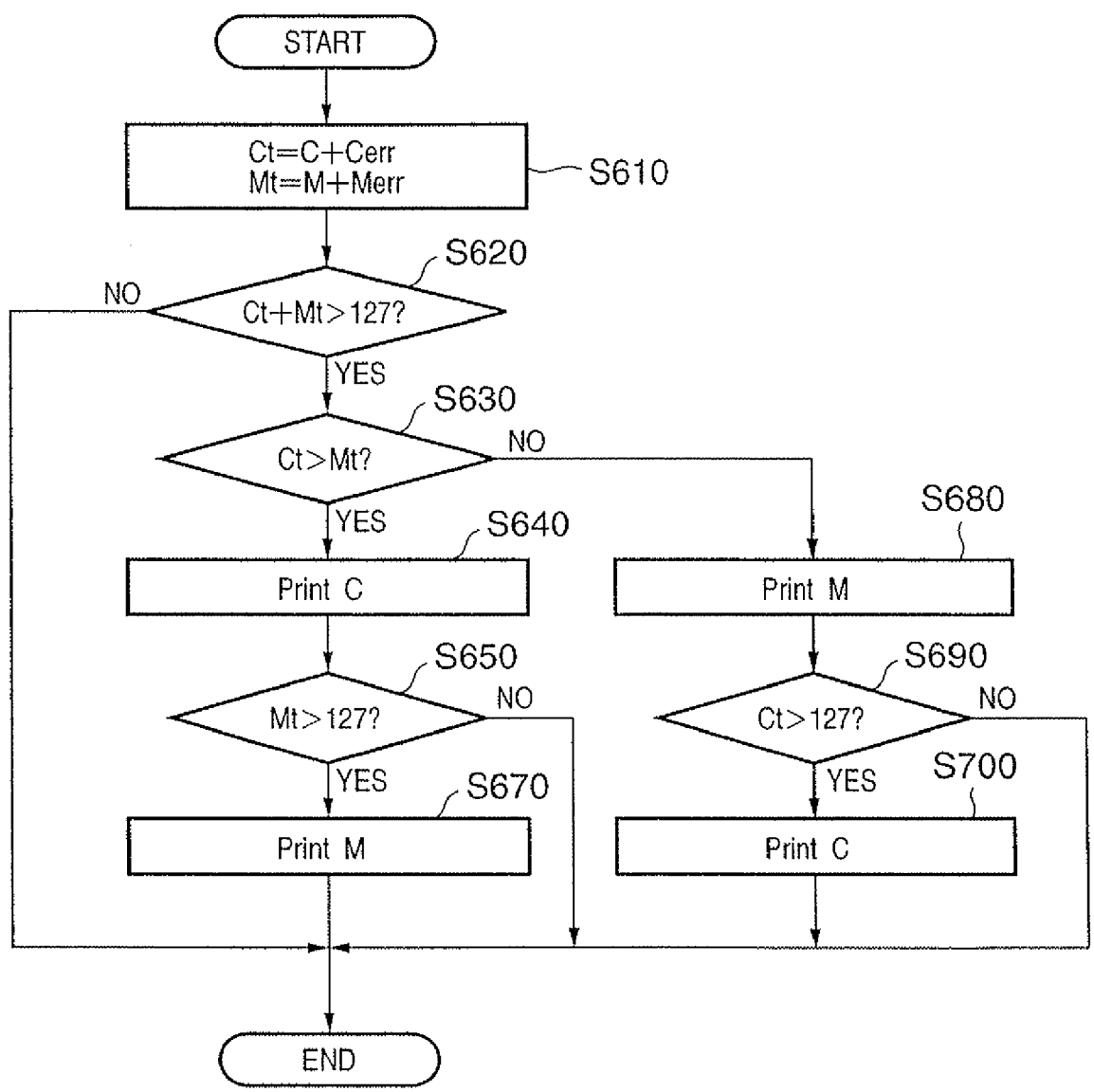
FIG. 20 is a flowchart showing the image formation control according to a sixth embodiment of the present invention.

FIG. 20 is a flowchart showing the image formation control according to the sixth embodiment of the present invention.

Hereinbelow, the feature of the present embodiment will be described with reference to the flowchart.

First, at step S610, the density values Ct and Mt of the C and M components of pixel of interest are obtained as in the case of the conventional art. Next, at step S620, it is determined whether or not the sum of the obtained M component density value Mt and the C component density value Ct is greater than a density value 127 used as a threshold value. If Ct+Mt>127 holds, the process proceeds to step S630, at which the M component density value Mt and the C component density value Ct are compared with each other.

If Ct>Mt holds, the process proceeds to step S640, at which setting is made for printing with the C ink. Further, at step S650, it is determined whether or not the M component density value Mt is greater than the threshold value 127. If Mt>127 holds, the process proceeds to step S670, at which setting is made for printing with the M ink. Then the process ends. On the other hand, if Mt≦127 holds, the process skips step S670 and the process ends.

At step S630, if Ct≦Mt holds, the process proceeds to step S680, at which setting is made for printing with the M ink. Further, the process proceeds to step S690, at which it is determined whether or not the C component density value Ct is greater than the threshold value 127. If Ct>127 holds, the process proceeds to step S700, at which setting is made for printing with the C ink. Then, the process ends. On the other hand, if Ct≦127 holds, the process skips step S700 and the process ends.

Further, at step S620, if Ct+Mt≦127 holds, the process ends.

Figure 21:
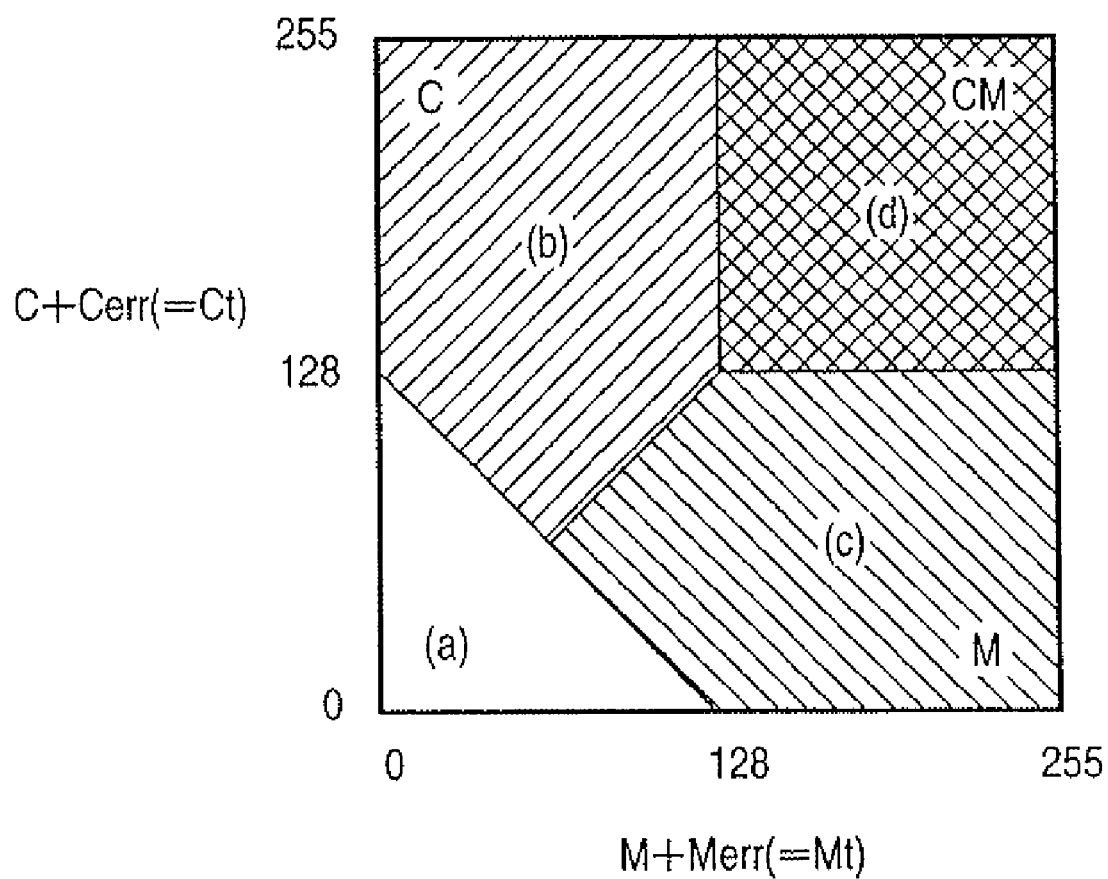
FIG. 21 is a diagram showing threshold conditions used in the sixth embodiment.

FIG. 21 is a diagram showing threshold conditions for the C and M components in the processing shown in FIG. 20.

In the above-described processing, the following dot arrangements are made in accordance with the M component density value Mt and the C component density value Ct.

(1) Ct+Mt≦127

(C and M components belong to low density area→area (a) in FIG. 21)

Dot printing is not performed.

(2) Ct+Mt>127 and Ct>Mt and Mt>127

(C and M components belong to intermediate to high density area→area (d) in FIG. 21)

Dot printing with C and M inks (overlay printing).

(3) Ct+Mt>127 and Ct>Mt and Mt≦127

(only C component belongs to intermediate to high density area→area (b) in FIG. 21)

Dot printing with only C ink (exclusive printing).

(4) Ct+Mt>127 and Ct≦Mt and Ct>127

(C and M components belong to intermediate to high density area→area (d) in FIG. 21)

Dot printing with C and M inks (overlay printing).

(5) Ct+Mt>127 and Ct≦Mt and Ct≦127

(only M component belongs to intermediate to high density area→area (c) in FIG. 21)

Dot printing with only M ink (exclusive printing).

Accordingly, in the above-described embodiment, if only one density component has a sufficiently high density, printing pixels are formed for the color component without depending on another component. Thus, printing independency of the C and M components in intermediate to high density areas is enhanced. Thus the uniformity of image can be maintained in intermediate and higher density areas.

Seventh Embodiment

In the sixth embodiment, the multivalued density data is binarized by the error diffusion processing; in the present embodiment, multivalued density data is ternarized by the error diffusion processing.

Figure 22:
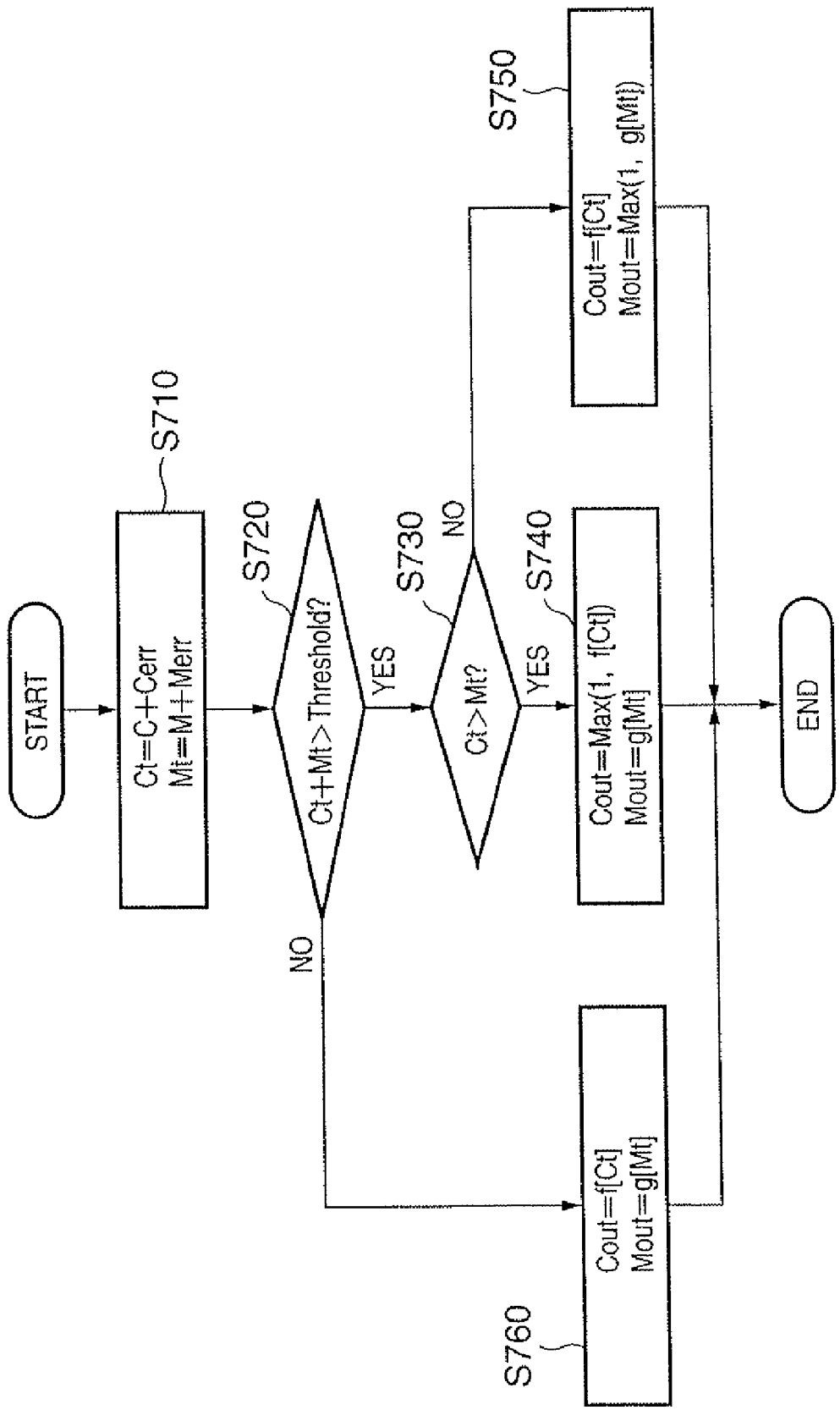
FIG. 22 is a flowchart showing the image formation control according to a seventh embodiment of the present invention.

FIG. 22 is a flowchart showing the image formation control according to the seventh embodiment of the present invention.

Hereinbelow, the feature of the present embodiment will be described with reference to the flowchart.

First, at step S710, the density values Ct and Mt of the C and M components of pixel of interest are obtained as in the case of the conventional art. Next, at step S720, the sum of the obtained M component density value Mt and the C component density value Ct is compared with a threshold value (Threshold). If Ct+Mt>Threshold holds, the process proceeds to step S730, while if Ct+Mt≦Threshold holds, proceeds to step S760.

At step S730, the M component density value Mt and the C component density value Ct are compared with each other. If Ct>Mt holds, the process proceeds to step S740, at which output values by the error diffusion processing of the C and M components are determined.

That is, a common multivalue conversion table for the C and M components as shown in Table 10 is used. First, as the C component output value (C out), a greater one of "1" and f(Ct) value (in multivalue conversion table as a function of a density value Ct) is selected. For example, if f(Ct) is "0", C out=1 holds; if f(Ct) is "1", C out=1 holds; and if f(Ct) is "2", C out=2 holds.

Further, as the M component output value (M out), a value corresponding to the density value Mt is determined by referring to the multivalue conversion table of Table 10, as M out=g(Mt)(in multivalue conversion table as a function of a density value Mt).

TABLE 10

| DENSITY | MULTIVALUE OUTPUT VALUE |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 0 |
| 24 | 0 |
| 25 | 0 |

TABLE 10-continued

| DENSITY | MULTIVALUE OUTPUT VALUE |
|---|---|
| 26 | 0 |
| 27 | 0 |
| 28 | 0 |
| 29 | 0 |
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |
| 51 | 0 |
| 52 | 0 |
| 53 | 0 |
| 54 | 0 |
| 55 | 0 |
| 56 | 0 |
| 57 | 0 |
| 58 | 0 |
| 59 | 0 |
| 60 | 0 |
| 61 | 0 |
| 62 | 0 |
| 63 | 0 |
| 64 | 0 |
| 65 | 0 |
| 66 | 0 |
| 67 | 0 |
| 68 | 0 |
| 69 | 0 |
| 70 | 0 |
| 71 | 0 |
| 72 | 0 |
| 73 | 0 |
| 74 | 0 |
| 75 | 0 |
| 76 | 0 |
| 77 | 0 |
| 78 | 0 |
| 79 | 0 |
| 80 | 0 |
| 81 | 0 |
| 82 | 0 |
| 83 | 0 |
| 84 | 0 |
| 85 | 1 |
| 86 | 1 |
| 87 | 1 |
| 88 | 1 |
| 89 | 1 |
| 90 | 1 |
| 91 | 1 |
| 92 | 1 |
| 93 | 1 |
| 94 | 1 |
| 95 | 1 |
| 96 | 1 |
| 97 | 1 |
| 98 | 1 |
| 99 | 1 |
| 100 | 1 |
| 101 | 1 |

TABLE 10-continued

| DENSITY | MULTIVALUE OUTPUT VALUE |
|---|---|
| 102 | 1 |
| 103 | 1 |
| 104 | 1 |
| 105 | 1 |
| 106 | 1 |
| 107 | 1 |
| 108 | 1 |
| 109 | 1 |
| 110 | 1 |
| 111 | 1 |
| 112 | 1 |
| 113 | 1 |
| 114 | 1 |
| 115 | 1 |
| 116 | 1 |
| 117 | 1 |
| 118 | 1 |
| 119 | 1 |
| 120 | 1 |
| 121 | 1 |
| 122 | 1 |
| 123 | 1 |
| 124 | 1 |
| 125 | 1 |
| 126 | 1 |
| 127 | 1 |
| 128 | 1 |
| 129 | 1 |
| 130 | 1 |
| 131 | 1 |
| 132 | 1 |
| 133 | 1 |
| 134 | 1 |
| 135 | 1 |
| 136 | 1 |
| 137 | 1 |
| 138 | 1 |
| 139 | 1 |
| 140 | 1 |
| 141 | 1 |
| 142 | 1 |
| 143 | 1 |
| 144 | 1 |
| 145 | 1 |
| 146 | 1 |
| 147 | 1 |
| 148 | 1 |
| 149 | 1 |
| 150 | 1 |
| 151 | 1 |
| 152 | 1 |
| 153 | 1 |
| 154 | 1 |
| 155 | 1 |
| 156 | 1 |
| 157 | 1 |
| 158 | 1 |
| 159 | 1 |
| 160 | 1 |
| 161 | 1 |
| 162 | 1 |
| 163 | 1 |
| 164 | 1 |
| 165 | 1 |
| 166 | 1 |
| 167 | 1 |
| 168 | 1 |
| 169 | 1 |
| 170 | 2 |
| 171 | 2 |
| 172 | 2 |
| 173 | 2 |
| 174 | 2 |
| 175 | 2 |
| 176 | 2 |
| 177 | 2 |
| 178 | 2 |
| 179 | 2 |
| 180 | 2 |
| 181 | 2 |
| 182 | 2 |
| 183 | 2 |
| 184 | 2 |
| 185 | 2 |
| 186 | 2 |
| 187 | 2 |
| 188 | 2 |
| 189 | 2 |
| 190 | 2 |
| 191 | 2 |
| 192 | 2 |
| 193 | 2 |
| 194 | 2 |
| 195 | 2 |
| 196 | 2 |
| 197 | 2 |
| 198 | 2 |
| 199 | 2 |
| 200 | 2 |
| 201 | 2 |
| 202 | 2 |
| 203 | 2 |
| 204 | 2 |
| 205 | 2 |
| 206 | 2 |
| 207 | 2 |
| 208 | 2 |
| 209 | 2 |
| 210 | 2 |
| 211 | 2 |
| 212 | 2 |
| 213 | 2 |
| 214 | 2 |
| 215 | 2 |
| 216 | 2 |
| 217 | 2 |
| 218 | 2 |
| 219 | 2 |
| 220 | 2 |
| 221 | 2 |
| 222 | 2 |
| 223 | 2 |
| 224 | 2 |
| 225 | 2 |
| 226 | 2 |
| 227 | 2 |
| 228 | 2 |
| 229 | 2 |
| 230 | 2 |
| 231 | 2 |
| 232 | 2 |
| 233 | 2 |
| 234 | 2 |
| 235 | 2 |
| 236 | 2 |
| 237 | 2 |
| 238 | 2 |
| 239 | 2 |
| 240 | 2 |
| 241 | 2 |
| 242 | 2 |
| 243 | 2 |
| 244 | 2 |
| 245 | 2 |
| 246 | 2 |
| 247 | 2 |
| 248 | 2 |
| 249 | 2 |
| 250 | 2 |
| 251 | 2 |
| 252 | 2 |
| 253 | 2 |

TABLE 10-continued

| DENSITY | MULTIVALUE OUTPUT VALUE |
|---------|-------------------------|
| 254 | 2 |
| 255 | 2 |

Further, if Ct≦Mt holds, the process proceeds to step S750, at which the common multivalue conversion table for the C and M components shown in the Table 10 is referred to, and the output values from the error diffusion processing of the C and M components are determined.

That is, as the C component output value (C out), a value corresponding to the density value Ct is determined by referring to the multivalue conversion table of Table 10, as C out=f(Ct), and as the M component output value (M out), a greater one of "1" and g(Mt) value (in multivalue conversion table as a function of a density value Mt) is selected.

Further, at step S760, the common multivalue conversion table for the C and M components shown in the Table 10 is referred to, then, as the C component output value (C out), a value corresponding to the density value Ct is determined by referring to the multivalue conversion table in Table 10, as C out=f(Ct), and as the M component output value (M out), a value corresponding to the density value Mt is determined by referring to the multivalue conversion table of Table 10, as M out=g(Mt).

After steps S740 and S750 or S760, the process ends.

Note that in this embodiment, "85" is used as the threshold value (Threshold).

Figure 23:
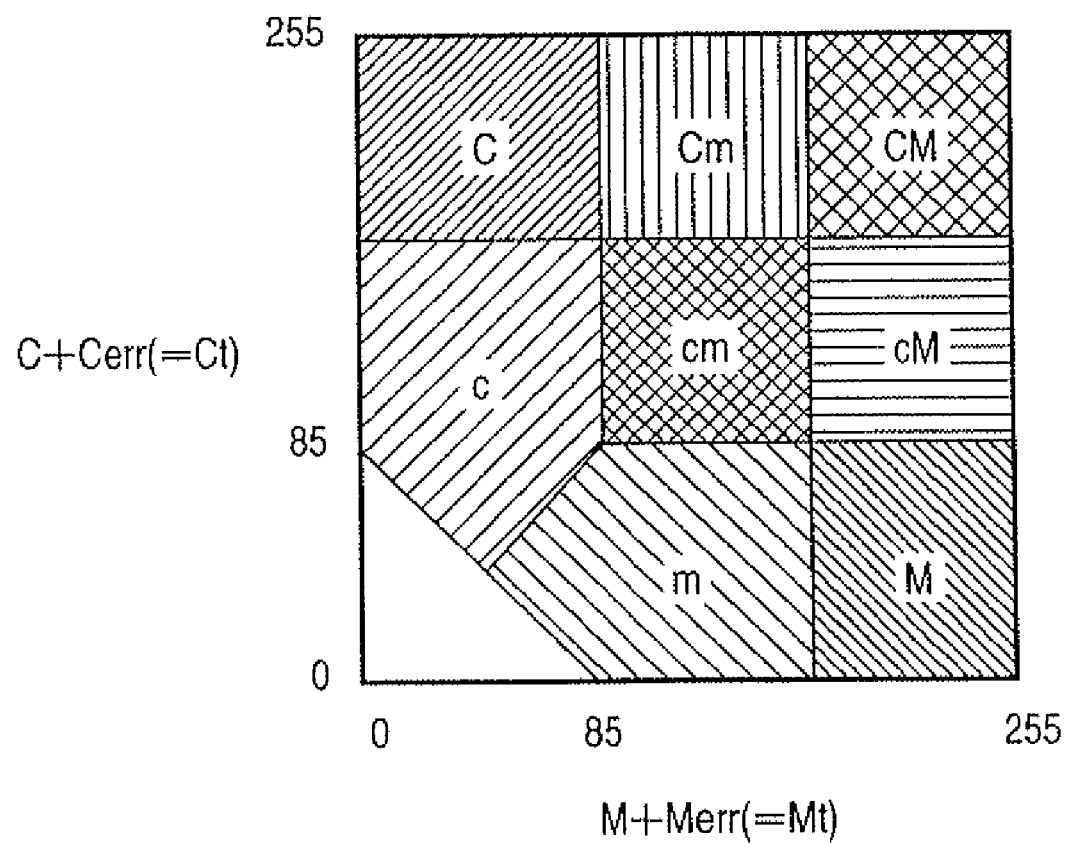
FIG. 23 is a diagram showing threshold conditions used in the seventh embodiment.

FIG. 23 is a diagram showing threshold conditions regarding the C and M components in the processing shown in FIG. 22.

Further, in the present embodiment, for the sake of simplification of explanation, a common table is used as the multivalue conversion tables f(Ct) and g(Mt), however, the common table is not necessarily used but separate tables may be used.

Further, Table 10 merely has density values 0 to 255, however, as actual density values Ct and Mt may have density variation widths, which may differ in accordance with conditions of multivalue conversion means and error diffusion method, about −128 to +383 at the maximum, the present invention is not limited to the values shown in Table 10. In the present embodiment, although the following values are not included for the sake of simplification of explanation, actually unshown Ct(Mt) table part of "0" or less may have the same values of those in the Ct(Mt)=0 multivalue conversion table, and unshown Ct(Mt) table part of "255" or more may have the same values of those in the Ct(Mt)=255 multivalue conversion table.

Note that in the present embodiment, only ternarization is handled, however, if the ink-jet printer as the image output device is capable of handling quaternary or quinary representation by using drop modulation and same-color various density ink (e.g. thin cyan ink, thick cyan ink, thin magenta ink and thick magenta ink), threshold tables for multivalue error diffusion processing such as quaternarization or quinarization may be generated.

Accordingly, in the above-described embodiment, even in conversion of multivalued image data into N-ary code, as the processing is performed by using a predetermined format threshold table, even if the threshold conditions are complicated, the processing can be performed in a simple manner, and as the processing is simple, the complicated threshold conditional process can be performed at a high speed.

Note that in the above embodiments, the liquid discharged from the printhead has been described as ink, and the liquid contained in the ink tank has been described as ink. However, the liquid is not limited to ink. For example, the ink tank may contain processed liquid or the like discharged to a print medium to improve fixability or water repellency of a printed image or to increase the image quality.

The embodiments described above have exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open Publication No. 59-123670 which discloses the arrangement using a slot common to a plurality of electrothermal transducers as a discharge portion of the electrothermal transducers, or Japanese Patent Laid-Open No. 59-138461 Publication which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main body and can receive ink from the apparatus main body upon being mounted on the apparatus main body can be employed as well as a cartridge type printhead in which an ink tank is integrally arranged on the printhead itself as described in the above embodiments.

It is preferable to add recovery means for the printhead, preliminary auxiliary means and the like to the above-described construction of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open Publication No. 54-56847 or 60-71260. In the present invention, the above-mentioned film boiling method is most effective for the above-mentioned inks.

In addition, the ink-jet printer of the present invention may be used in the form of a copying machine combined with a reader and the like, or a facsimile apparatus having a transmission/reception function in addition to an image output terminal of an information processing apparatus such as a computer.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for performing error diffusion processing on multivalued image data comprised of plural density data and outputting a result of the error diffusion processing, comprising:
   a first determination unit configured to, upon performing error diffusion processing on a first density data of the plural density data, determine a threshold value used for the error diffusion processing on the first density data, based on a second density data of the plural density data;
   a first error diffusion unit configured to perform the error diffusion processing on the first density data, based on the threshold value determined by said first determination unit;
   a first output unit configured to output a result of the error diffusion processing performed by said first error diffusion unit;
   a second determination unit configured to, upon performing error diffusion processing on the second density data, determine a threshold value used for the error diffusion processing on the second density data, based on a density value of the first density data;
   a second error diffusion unit configured to perform the error diffusion processing on the second density data, based on the threshold value determined by said second determination unit; and
   a second output unit configured to output a result of the error diffusion processing performed by said second error diffusion unit.

2. The apparatus according to claim 1, wherein said first and second determination units use, for determining the respective threshold values, a table for defining a relationship between threshold values and density values.

3. The apparatus according to claim 1, wherein said first and second determination units respectively determine plural threshold values.

4. The apparatus according to claim 3, wherein said first and second determination units respectively use, for determining each of the plural threshold values, plural tables each for defining a relationship between thresholds and density values.

5. The apparatus according to claim 1, wherein the plural density data are a yellow component, a magenta component, a cyan component and a black component, and the first density data is the cyan component, and the second density data is the magenta component, and a third color component is the black component.

6. The apparatus according to claim 1, further comprising an image formation unit configured to input the results of the error diffusion processing performed by said first and second error diffusion units, and form an image.

7. The apparatus according to claim 6, wherein said image formation unit is an ink-jet printer.

8. An image processing method for performing error diffusion processing on multivalued image data comprised of plural density data and outputting a result of the error diffusion processing, comprising:

a first determination step of, upon performing error diffusion processing on a first density data of the plural density data, determining a threshold value used for the error diffusion processing on the first density data, based on a second density data of the plural density data;

a first error diffusion step of performing the error diffusion processing on the first density data, based on the threshold value determined at said first determination step;

a first output step of outputting a result of the error diffusion processing performed at said first error diffusion step;

a second determination step of, upon performing error diffusion processing on the second density data, determining a threshold value used for the error diffusion processing on the second density data, based on density value of the first density data;

a second error diffusion step of performing the error diffusion processing on the second density data, based on the threshold value determined at said second determination step; and a second output step of outputting a result of the error diffusion processing performed at said second error diffusion step.

9. A non-transitory computer readable memory for storing a program for executing an image processing method according to claim 8 in a computer.

* * * * *